(12) United States Patent
Bauck et al.

(10) Patent No.: US 10,457,539 B2
(45) Date of Patent: Oct. 29, 2019

(54) DISPENSING METER FOR FLUID DISPENSING

(71) Applicant: Graco Minnesota Inc., Minneapolis, MN (US)

(72) Inventors: Mark L. Bauck, Coon Rapids, MN (US); Glenn E. Highland, East Bethel, MN (US); Bradley G. Kahler, Otsego, MN (US); Benjamin J. Paar, Minneapolis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 28 days.

(21) Appl. No.: 15/928,828

(22) Filed: Mar. 22, 2018

(65) Prior Publication Data

US 2019/0084822 A1 Mar. 21, 2019

Related U.S. Application Data

(60) Provisional application No. 62/558,992, filed on Sep. 15, 2017.

(51) Int. Cl.

| | |
|---|---|
| *B67D 7/52* | (2010.01) |
| *B67D 7/34* | (2010.01) |
| *B67D 7/42* | (2010.01) |
| *G01F 15/00* | (2006.01) |
| *B67D 7/12* | (2010.01) |
| *G01F 3/14* | (2006.01) |

(52) U.S. Cl.
CPC ............... *B67D 7/52* (2013.01); *B67D 7/12* (2013.01); *B67D 7/425* (2013.01); *B67D 7/426* (2013.01); *G01F 3/14* (2013.01); *G01F 15/003* (2013.01)

(58) Field of Classification Search
CPC combination set(s) only.
See application file for complete search history.

(56) References Cited

U.S. PATENT DOCUMENTS

| | | |
|---|---|---|
| 5,423,348 A | 6/1995 | Jezek et al. |
| 6,412,516 B1 | 7/2002 | Goldsmith |
| 8,466,933 B2 | 6/2013 | Nishikawa |
| 8,537,847 B2 | 9/2013 | Fujii et al. |
| 8,869,071 B2 | 10/2014 | Cho et al. |
| 9,098,069 B2 | 8/2015 | Dickinson et al. |
| 2007/0188450 A1 | 8/2007 | Hernandez et al. |
| 2009/0314980 A1 | 12/2009 | Breeser |
| 2012/0068926 A1 | 3/2012 | Huang |

(Continued)

FOREIGN PATENT DOCUMENTS

| | | |
|---|---|---|
| EP | 1656997 A2 | 5/2006 |
| KR | 200374929 Y1 | 2/2005 |

OTHER PUBLICATIONS

International Search Report and Written Opinion for PCT Application No. PCT/US2018/023863, dated Aug. 31, 2018, 17 pages.

*Primary Examiner* — Jewel V Dowtin
(74) *Attorney, Agent, or Firm* — Kinney & Lange, P.A.

(57) ABSTRACT

A handheld fluid meter includes circuitry configured to invert the orientation of a visual output provided by a display of the handheld fluid meter and to modify the functionality of buttons that control scrolling on the display. The control circuitry inverts the orientation of the visual output based on a command provided to the control circuitry by a user or by a position sensor.

20 Claims, 20 Drawing Sheets

(56) References Cited

U.S. PATENT DOCUMENTS

| | | |
|---|---|---|
| 2012/0242701 A1 | 9/2012 | Ingrassia, Jr. |
| 2013/0314445 A1 | 11/2013 | Fujii et al. |
| 2019/0084823 A1* | 3/2019 | Norman .................. B67D 7/52 |
| 2019/0106319 A1* | 4/2019 | Kahler .................... B67D 7/34 |

* cited by examiner

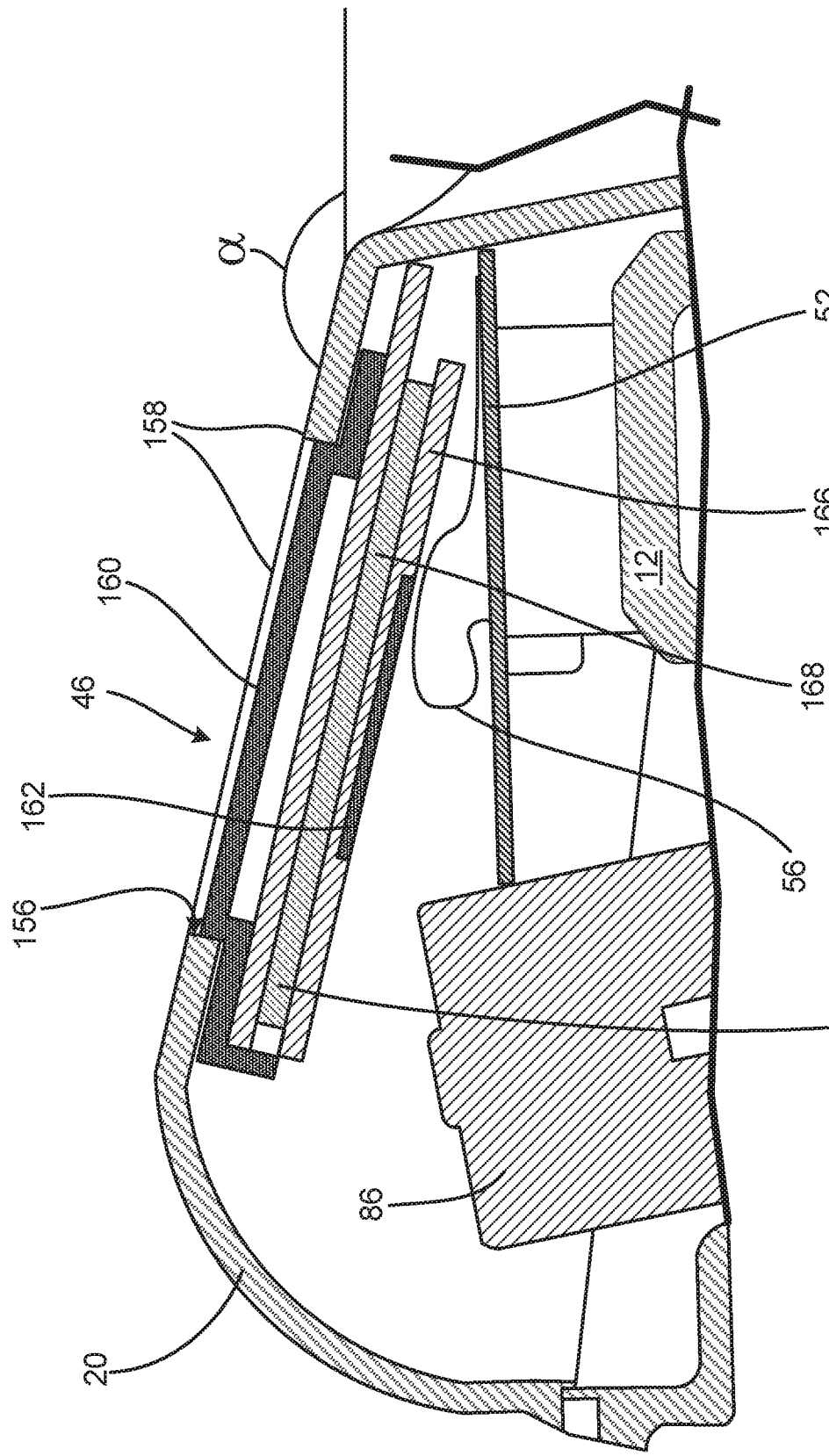

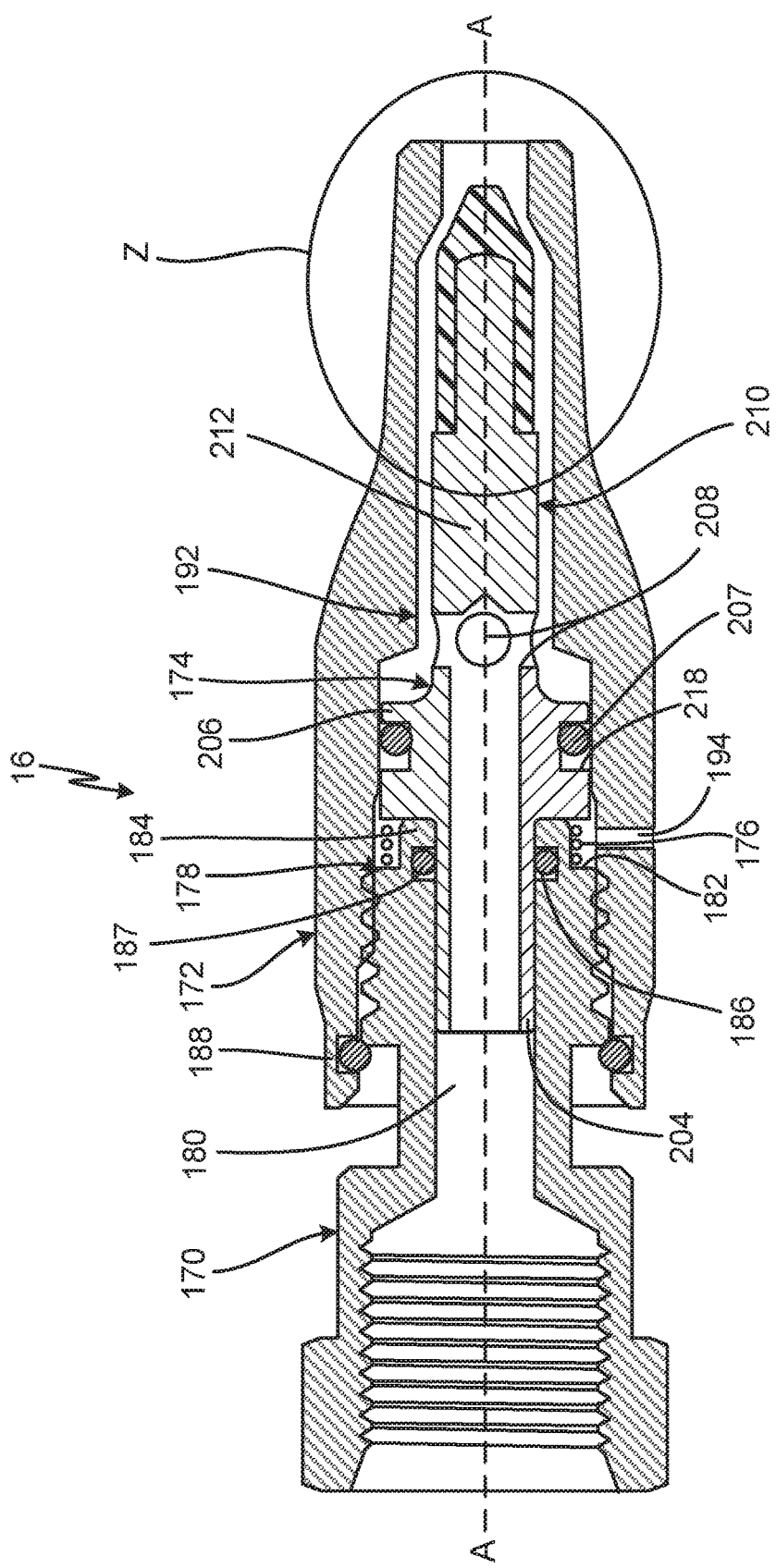

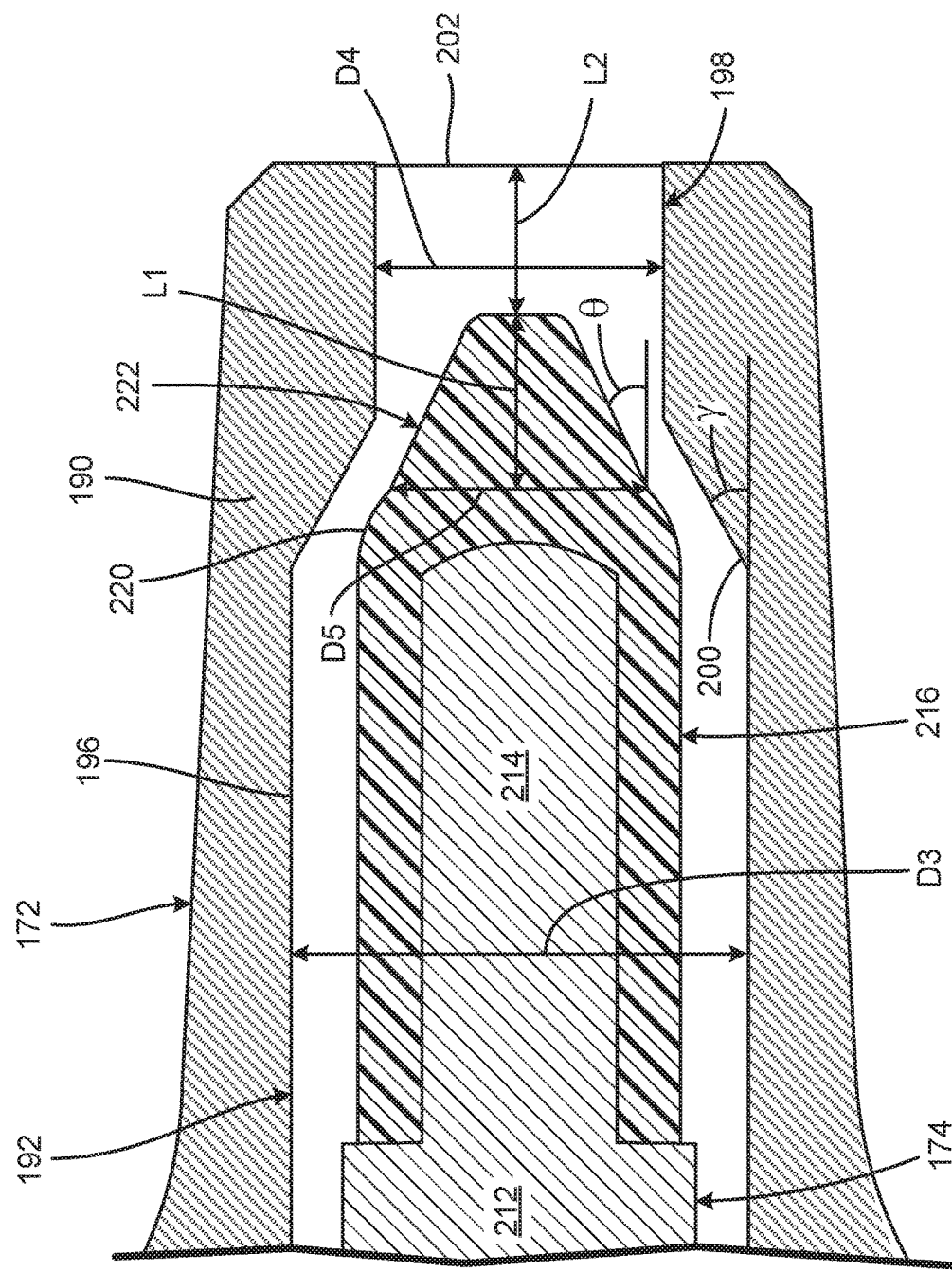

DISPENSING METER FOR FLUID DISPENSING

CROSS-REFERENCE TO RELATED APPLICATION(S)

This application claims priority to U.S. Provisional Application No. 62/558,992 filed Sep. 15, 2017, and entitled "DISPENSING METER AND CARTRIDGE VALVE FOR FLUID DISPENSING," the disclosure of which is hereby incorporated in its entirety. This application is being filed concurrently with U.S. patent application Ser. No. 15/928,797, entitled "DISPENSING METER AND NOZZLE FOR FLUID DISPENSING," filed Mar. 22, 2018, the disclosures of which are related.

BACKGROUND

This disclosure relates generally to fluid dispensing. More particularly, this disclosure relates to dispensing meters.

Automotive fluids, such as antifreeze, transmission fluid, and engine oil, are typically dispensed from bulk containers. For example, automotive service stations typically dispense small amounts of engine oil from a large drum using a handheld meter. The handheld meter receives fluid from the bulk storage drum and dispenses a desired volume of the fluid at a desired location. The user can use the user interface of the handheld meter to communicate with a central fluid monitoring computer to track and record the volume of fluid dispensed from the bulk containers. In current handheld meters, the user interface includes a button elevated above the handle, such that users typically set the handheld meter on the ground prior to inputting information. In addition, the display screen is susceptible to damage if the handheld meter is dropped or otherwise collides with an object.

A valve is disposed within the handheld meter and controls the flow of fluid through the device. The valve can be controlled by a trigger. The valve can be a manual valve, controlled on and off by a manual trigger; a pre-set metered valve, which includes a manual trigger but the valve automatically closes after a pre-set volume of fluid has been dispensed; or a metered valve, where the trigger cannot activate the valve until the handheld meter receives a dispense authorization. When the valve is initially activated, a control seal can shift into the fluid inlet, where high-velocity fluid impingement can cause the control seal to become displaced and unseated. When the valve closes, the control seal can experience scarfing when the control seal encounters a sharp edge geometry. Scarfing most commonly occurs when the valve is quickly modulated between slightly-open and slightly-closed positions, such as when the user is topping off the fluid at the end of a fluid dispense event. The valve also includes a top dynamic seal that can have minor leaking during valve reciprocation. The minor leakage can occur due to seal cross-sectional rotation due to valve reciprocation and because the top dynamic seal is always experiencing fluid pressure. In addition, the top dynamic seal contacts the cast housing of the handheld meter and can experience leakage due to the porosity of the cast housing.

Dynamic pressure forces can also exert a higher force on an upper portion of the valve than the lower portion of the valve, which can overcome the spring force that shifts the valve to the closed position. The valve can thus become stuck in the open position due to pressure imbalances within the valve chamber.

To replace the valve, the trigger is removed from the trigger control mechanism. The electronics bezel housing must be removed to provide access to the trigger mechanism pivot point. As such, the bezel housing and various other components of the handheld meter must be removed prior to replacing the valve. In addition, residual oil can remain in the valve cavity during valve replacement. The residual oil can migrate through the valve when the valve is reinstalled and can appear to the user as a new leak, even where there is no leak in the valve.

The fluid is dispensed out of the handheld meter through a nozzle. The nozzle includes an acetal seat on which a rounded, steel nozzle stem seats. The nozzle can experience leakage when contaminants are present in the fluid. In addition, the nozzle can experience fluid sputtering and/or stream fanning at high flow rates, and the nozzle can experience latent dripping of the fluid that remains in the nozzle tip when the nozzle stem shifts to the closed position.

SUMMARY

According to one aspect of the disclosure, a handheld fluid meter for use in an oil bar includes a meter body having a handle, a fluid inlet extending into the handle, and a fluid outlet extending out of an end of the meter body opposite the handle; a trigger configured to be manually displaced to control a flow of fluid between the fluid inlet and the fluid outlet; a bezel housing mounted on the meter body, the bezel housing including a display opening; a display screen fixedly mounted within the display opening; a user input fixedly mounted on the bezel housing, the user input including a plurality of buttons; display circuitry configured to provide a visual output at the display screen in a plurality of orientations; user input circuitry configured to receive inputs from a user via the plurality of buttons to modify the visual output of the display screen; and control circuitry connected to communicate with the display circuitry and the user input circuitry, the control circuitry configured to receive an input regarding a desired orientation of the visual output from the user input circuitry and to provide instructions to the display circuitry to modify the orientation of the visual output.

According to another aspect of the disclosure, a dispense assembly for use in an oil bar includes a handheld fluid meter and a manifold configured to be mounted in an oil bar, the manifold including a manifold inlet opening and a manifold outlet opening. The handheld fluid meter includes a meter body having a handle, a fluid inlet extending into the handle, and a fluid outlet extending out of an end of the meter body opposite the handle; a trigger configured to be manually displaced to control a flow of fluid between the fluid inlet and the fluid outlet; a bezel housing mounted on the meter body, the bezel housing including a display opening; a display screen fixedly mounted within the display opening; a user input fixedly mounted on the bezel housing, the user input including a plurality of buttons; display circuitry configured to provide a visual output at the display screen in a plurality of orientations; user input circuitry configured to receive inputs from a user via the plurality of buttons to modify the visual output of the display screen; and control circuitry connected to communicate with the display circuitry and the user input circuitry, the control circuitry configured to receive an input regarding a desired orientation of the visual output from the user input circuitry and to provide instructions to the display circuitry to modify the orientation of the visual output. The handheld fluid meter is mounted on the manifold such that the handle extends vertically above the display.

According to yet another aspect of the disclosure, an oil bar assembly includes a frame having a first side support member, a second side support member, and a back panel, the back panel extending between and connecting the first side support member and the second side support member; a front panel extending between and attached to the first side support member and the second side support member, wherein the front panel and the back panel define a plenum, and wherein a dispenser opening extends through the front panel, and dispense assembly mounted to the front panel. The dispense assembly includes a handheld fluid meter, a manifold having a manifold inlet opening and a manifold outlet opening, the manifold disposed within the plenum and attached to the front panel. The dispense assembly further includes an outlet fitting, a manifold inlet adapter extending between and connecting the outlet fitting and the manifold inlet opening, a manifold outlet adapter extending through the dispenser opening and connected to the manifold outlet opening, a swivel elbow connecting the manifold outlet adapter; and a nozzle connected to the swivel elbow. The handheld fluid meter includes a meter body having a handle, a fluid inlet extending into the handle, and a fluid outlet extending out of an end of the meter body opposite the handle; a trigger configured to be manually displaced to control a flow of fluid between the fluid inlet and the fluid outlet; a bezel housing mounted on the meter body, the bezel housing including a display opening; a display screen fixedly mounted within the display opening; a user input fixedly mounted on the bezel housing, the user input including a plurality of buttons; display circuitry configured to provide a visual output at the display screen in a plurality of orientations; user input circuitry configured to receive inputs from a user via the plurality of buttons to modify the visual output of the display screen; and control circuitry connected to communicate with the display circuitry and the user input circuitry, the control circuitry configured to receive an input regarding a desired orientation of the visual output from the user input circuitry and to provide instructions to the display circuitry to modify the orientation of the visual output.

BRIEF DESCRIPTION OF THE DRAWINGS

FIG. 6 is an enlarged cross-sectional view of a bezel housing and a display.

FIG. 7A is a cross-sectional view of a nozzle taken along line 7-7 in FIG. 1A.

FIG. 7B is an enlarged view of detail Z in FIG. 7A showing a nozzle in an open position.

DETAILED DESCRIPTION

Figure 1A:
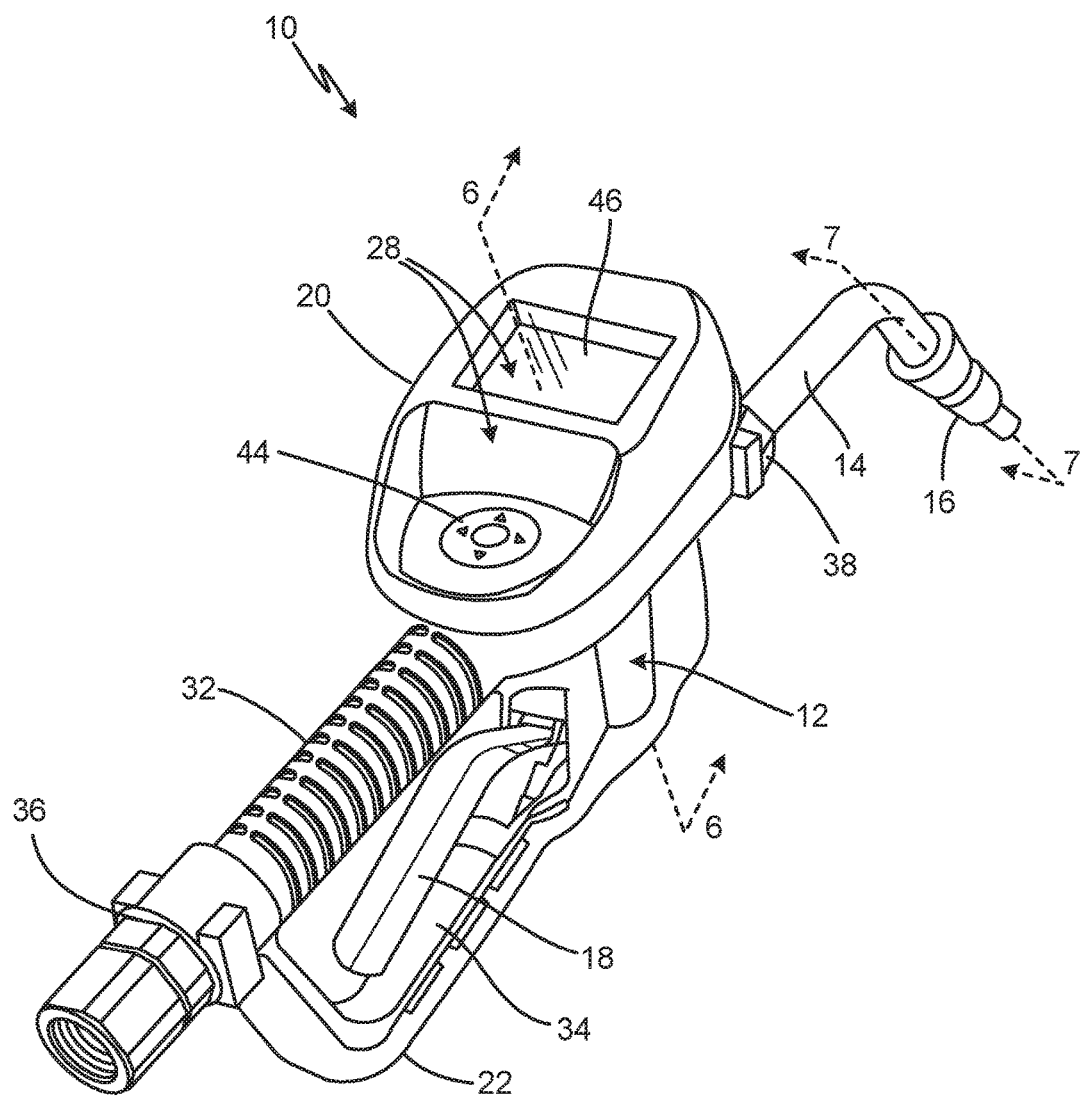
FIG. 1A is an isometric view of a handheld meter.
Figure 1B:
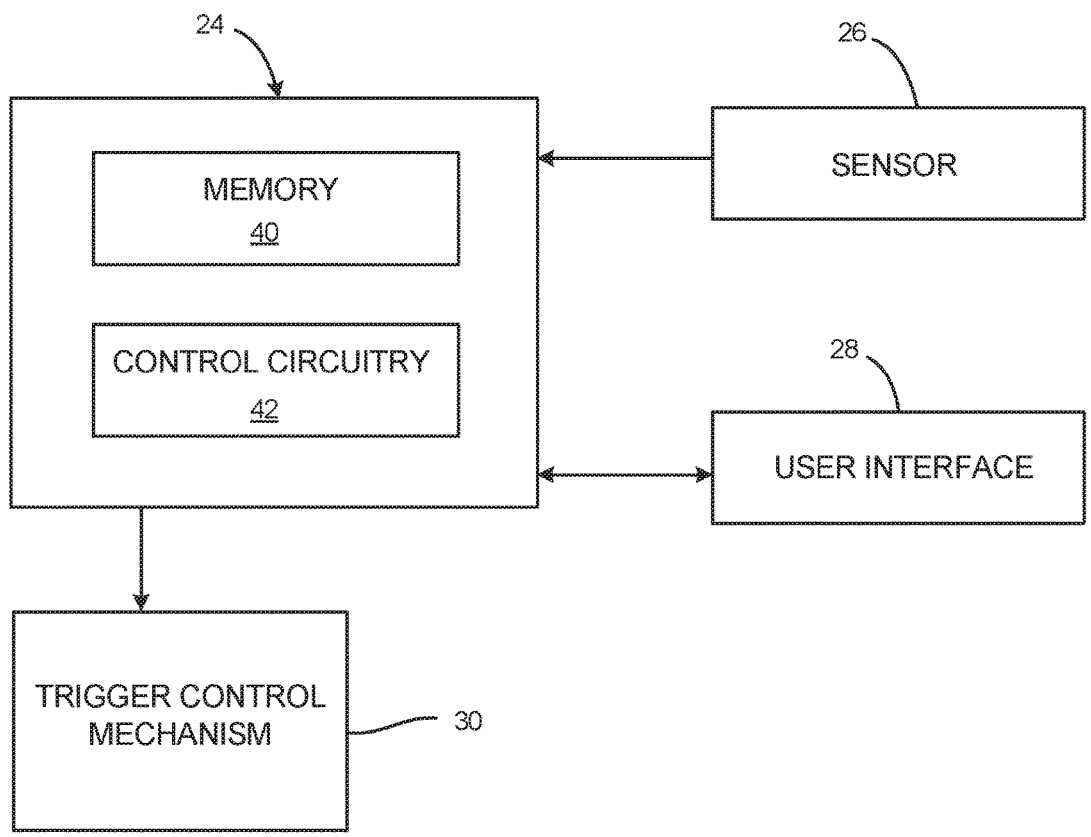
FIG. 1B is a simplified block diagram of the electronic components of a handheld meter.

FIG. 1A is an isometric view of handheld meter 10. FIG. 1B is a simplified schematic block diagram of the electronic components of handheld meter 10. FIGS. 1A and 1B will be discussed together. Handheld meter 10 includes meter body 12 (FIG. 1A), extension 14 (FIG. 1A), nozzle 16 (FIG. 1A), trigger 18 (FIG. 1A), bezel housing 20 (FIG. 1A), elastomeric trigger guard 22 (FIG. 1A), meter controller 24 (FIG. 1B), sensor 26 (FIG. 1B), user interface 28, and trigger control mechanism 30 (FIG. 1B). Meter body 12 includes handle 32 (FIG. 1A), integral trigger guard 34 (FIG. 1A), fluid inlet 36 (FIG. 1A), and fluid outlet 38 (FIG. 1A). Meter controller 24 includes memory 40 (FIG. 1B) and control circuitry 42 (FIG. 1B). User interface 28 includes input 44 (FIG. 1A) and display 46 (FIG. 1A). Handheld meter 10 is a meter for use in a system for dispensing fluid and tracking fluid dispenses. For example, the fluid dispensing system can be implemented in an automotive shop to track oil, automotive transmission fluid, coolant, and other bulk dispense fluids.

Fluid inlet 36 opens into handle 32 and is configured to connect to a supply line to receive fluid from a storage container. Fluid outlet 38 extends through meter body 12 downstream of an internal valve, such as valve 50 (best seen in FIGS. 3A-3C), and other metering components. Fluid outlet 38 provides an outlet for fluid to exit meter body 12. Extension 14 is connected to fluid outlet 38, and nozzle 16 is mounted on an end of extension 14 opposite fluid outlet 38. The fluid exits handheld meter 10 through nozzle 16.

Bezel housing 20 is mounted on meter body 12. Bezel housing 20 encloses and supports various electronic components of handheld meter 10, such as meter controller 24, user interface 28, and trigger control mechanism 30. Meter controller 24 is disposed in bezel housing 20 and includes memory 40 and control circuitry 42. Memory 40 stores software that, when executed by control circuitry 42, authorizes fluid dispenses, tracks and records the volume of each fluid dispense, and communicates fluid dispense information to and from the user. User interface 28 is disposed on and in bezel housing 20 and is configured to receive inputs from and provide outputs to the user. Input 44 is disposed on bezel housing 20 in line with handle 32. Input 44 is slightly elevated relative to handle 32 and is positioned in a convenient, ergonomic location for the user to utilize input 44 with the user's thumb while the user grasps handle 32 of handheld meter 10. Input 44 includes a button pad, but it is understood that input 44 can be of any suitable configuration for receiving information from the user, such as a touchscreen. Display 46 provides visual information to the user. For example, display 46 can be a liquid-crystal display ("LCD") for providing visual information to the user. Display 46 is oriented such that display 46 tilts towards handle 32, which positions display perpendicular to the user's viewing angle, providing an ergonomic viewing angle for the user.

Control circuitry 42, in one example, is configured to implement functionality and/or process instructions. For instance, control circuitry 42 can be capable of processing instructions stored in memory 40. Examples of control circuitry 42 can include any one or more of a microprocessor, a controller, a digital signal processor (DSP), an application specific integrated circuit (ASIC), a field-programmable gate array (FPGA), or other equivalent discrete or integrated logic circuitry.

Memory 40, in some examples, can be configured to store information during operation. Memory 40, in some examples, is described as computer-readable storage media. In some examples, a computer-readable storage medium can include a non-transitory medium. The term "non-transitory" can indicate that the storage medium is not embodied in a carrier wave or a propagated signal. In some examples, memory 40 is a temporary memory, meaning that a primary purpose of memory 40 is not long-term storage. Memory 40, in some examples, is described as volatile memory, meaning that memory 40 does not maintain stored contents when power to handheld meter 10 is turned off. Memory 40, in some examples, also includes one or more computer-readable storage media. Memory 40 can be configured to store larger amounts of information than volatile memory. Memory 40 can further be configured for long-term storage of information. In some examples, memory 40 includes non-volatile storage elements.

Trigger 18 extends from meter body 12 and interfaces with the valve disposed in meter body 12. The user pulls trigger 18 to shift the valve to the open position, thereby opening the fluid flow path through meter body 12 between fluid inlet 36 and fluid outlet 38. Integral trigger guard 34 is integral with meter body 12 and encloses trigger 18. As such, integral trigger guard 34 can be metallic, same as meter body 12. Elastomeric trigger guard 22 is mounted to integral trigger guard 34 and encloses the pivot point where trigger 18 connects to trigger control mechanism 30. Elastomeric trigger guard 22 is configured to prevent any pinching or entanglement at the pivot point.

During operation, the user grasps handle 32 to control the position of handheld meter 10 and to control dispenses from handheld meter 10. The user can input information to handheld meter 10 via input 44. In some examples, meter controller 24 wirelessly communicates with a system controller. Meter controller 24 can receive a dispense command and, based on the dispense command, can authorize a dispense event. With a dispense event authorized, meter controller 24 communicates with trigger control mechanism 30 allow trigger 18 to shift the valve to the open position. With the valve in the open position, the metered fluid flows through handheld meter 10 from fluid inlet 36 to fluid outlet 38 and then downstream to nozzle 16 through extension 14. The metered fluid is dispensed through nozzle 16. As the metered fluid flows through meter body 12, sensor 26 provides a measure of the volumetric flow of the fluid to meter controller 24. In some examples, sensor 26 is a reed switch configured to sense the rotation of metering gears in the fluid flow path between fluid inlet 36 and fluid outlet 38. When the volumetric flow reaches the authorized volume, meter controller 24 can deactivate trigger control mechanism 30 such that trigger 18 is no longer able to shift and/or hold the valve in the open position.

Figure 2A:
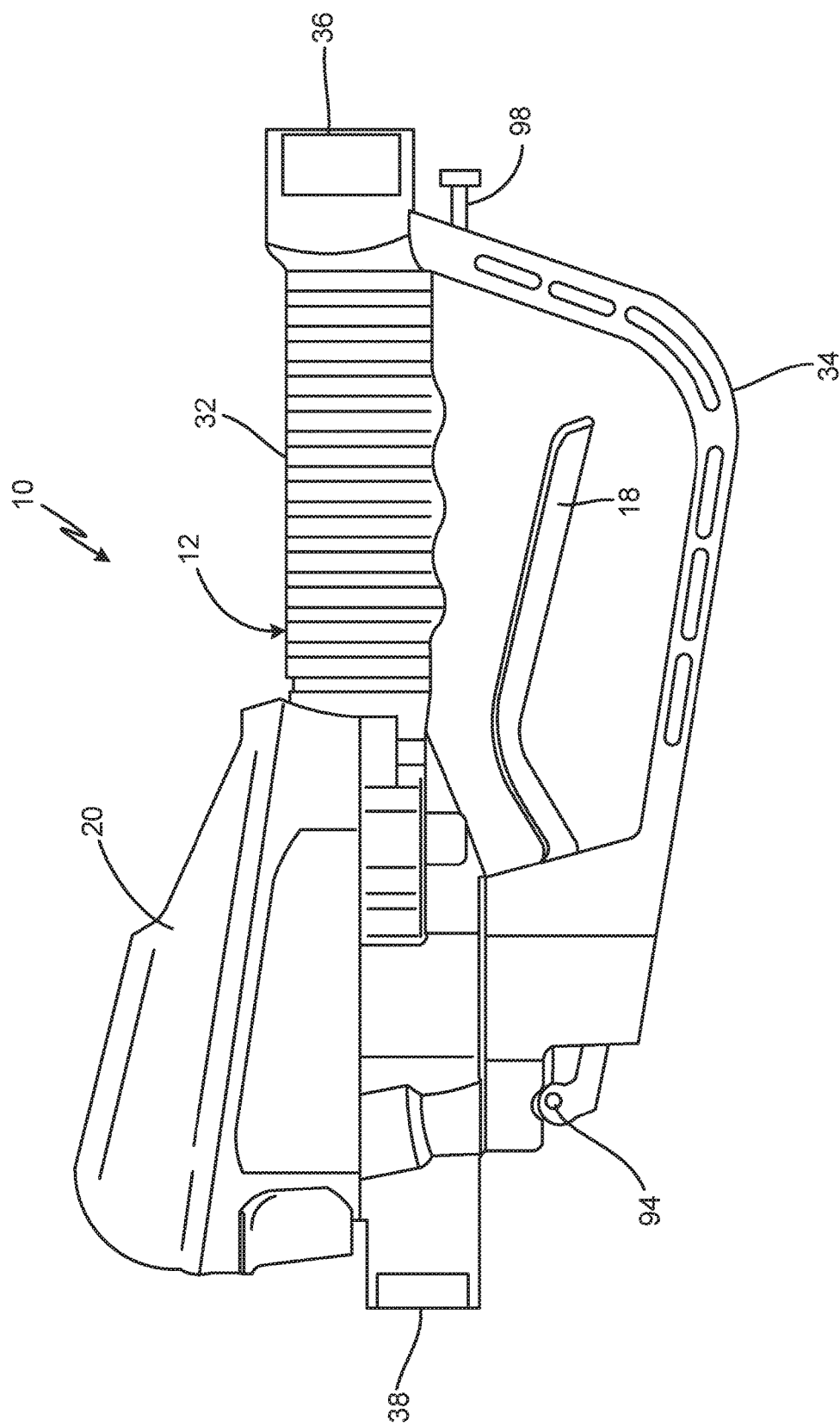
FIG. 2A is a side elevation view of a meter body of a dispense meter.
Figure 2B:
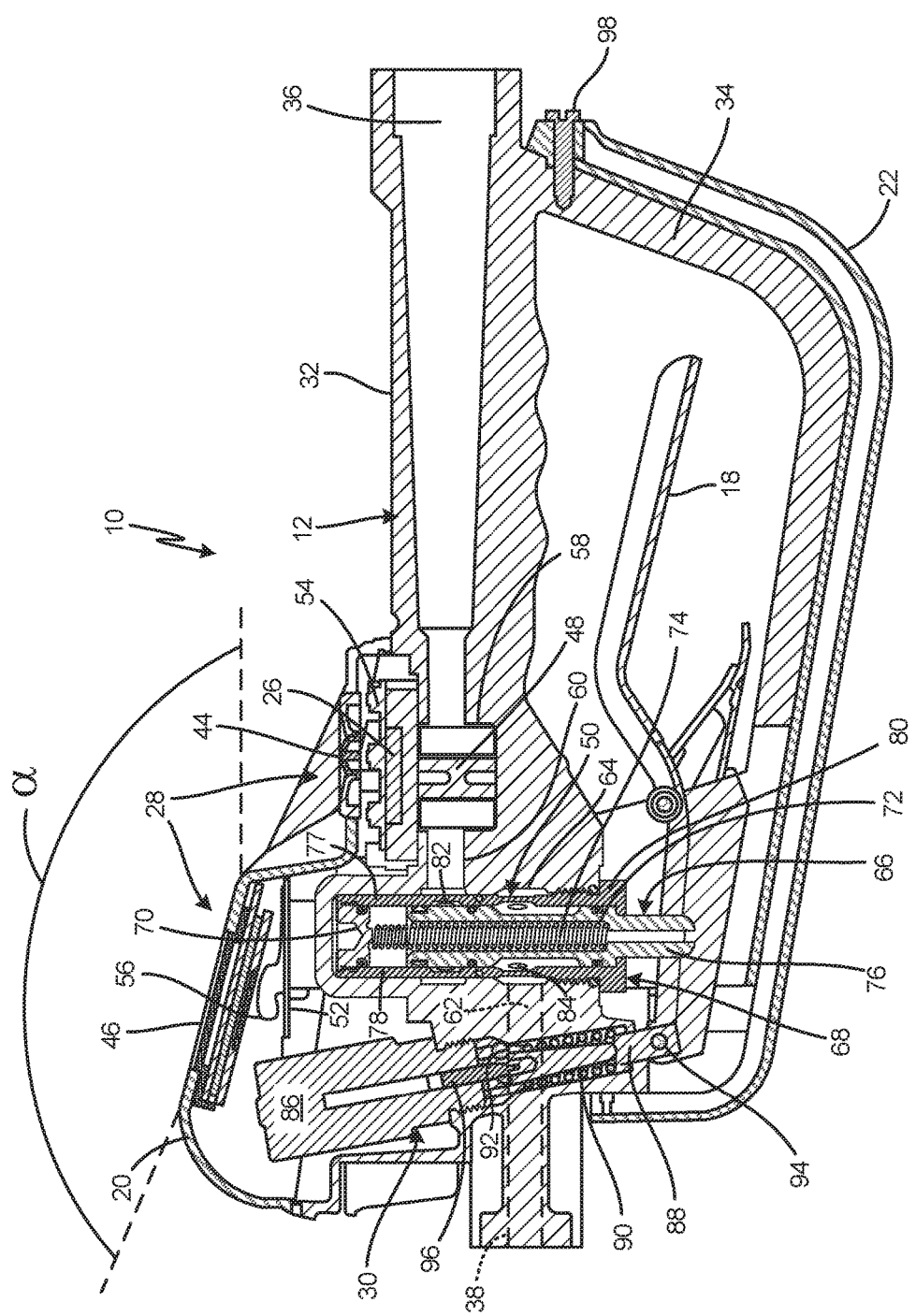
FIG. 2B is a cross-sectional view of the meter body of FIG. 2A.

FIG. 2A is a side elevation view of handheld meter 10. FIG. 2B is a cross-sectional view of handheld meter 10. FIGS. 2A-2B will be discussed together. Handheld meter 10 includes meter body 12, trigger 18, bezel housing 20, elastomeric trigger guard 22 (FIG. 2B), sensor 26 (FIG. 2B), user interface 28 (FIG. 2B), trigger control mechanism 30 (FIG. 2B), handle 32, meter 48 (FIG. 2B), valve 50 (FIG. 2B), first circuit board 52 (FIG. 2B), second circuit board 54 (FIG. 2B), and antenna 56 (FIG. 2B). Meter body 12 includes integral trigger guard 34, fluid inlet 36, fluid outlet 38, metering chamber 58 (FIG. 2B), valve inlet port 60 (FIG. 2B), valve outlet port 62 (FIG. 2B), and valve cavity 64 (FIG. 2B). User interface 28 includes input 44 (FIG. 2B) and display 46 (FIG. 2B). Valve 50 includes valve stem 66 (FIG. 2B), valve cartridge 68 (FIG. 2B), valve cap 70 (FIG. 2B), and valve spring 72 (FIG. 2B). Valve stem 66 includes stem bore 74 (FIG. 2B) and actuation tip 76 (FIG. 2B). Valve cartridge 68 includes cartridge body 77 (FIG. 2B), and cartridge body 77 includes first end 78 (FIG. 2B), second end 80 (FIG. 2B), radial inlets 82 (FIG. 2B), and radial outlets 84 (FIG. 2B). Trigger control mechanism 30 includes solenoid 86 (FIG. 2B), trip rod 88 (FIG. 2B), reset spring 90 (FIG. 2B), balls 92 (FIG. 2B), trigger pin 94, and plunger pin 96 (FIG. 2B).

Handle 32 is configured to be grasped by a single hand of the user. Trigger 18 is disposed below handle 32 and is configured to be pulled by the user to commence a dispense event. Integral trigger guard 34 is integral with meter body 12 and encloses trigger 18. Elastomeric trigger guard 22 is mounted to integral trigger guard 34 by fastener 98 and two additional fasteners (not shown) extending into meter body 12 at location 99. Elastomeric trigger guard 22 encloses the pivot point between trigger 18 and trigger control mechanism 30. Bezel housing 20 is mounted on meter body 12 and is configured to enclose various electronic components of handheld meter 10. Bezel housing 20 can be made of any suitable material, such as a plastic.

Trigger control mechanism 30 is attached to meter body 12 and partially extends into bezel housing 20. Trigger control mechanism 30 is configured to control trigger 18 between an activated state, where trigger 18 can actuate valve 50 to the open position, and a deactivated state, where trigger 18 cannot actuate valve 50. Solenoid 86 is connected to meter body 12. Trip rod 88 interfaces with solenoid 86 and extends between solenoid 86 and trigger 18. Balls 92 are disposed in trip rod 88. Plunger pin 96 extends from solenoid 86 and is configured to interface with balls 92 to lock trip rod 88 in position in the activated state. Trip rod 88 is connected to trigger 18 by trigger pin 94. Reset spring 90 is disposed around trip rod 88 and is configured to drive trip rod 88 towards solenoid 86 to return trip rod 88, and thus trigger 18, to an inactive position, such that trip rod 88 is ready to be engaged for the next dispense event.

Fluid inlet 36 extends into handle 32 of handheld fluid meter 48. Fluid inlet 36 is configured to connect to a supply line to receive fluid from a storage container through the supply line. Fluid inlet 36 extends through handle 32 to metering chamber 58. Metering chamber 58 is disposed in meter body 12 between fluid inlet 36 and valve inlet port 60. Meter 48 is disposed in metering chamber 58. In some examples, meter 48 is a positive displacement meter, such as a gear meter.

Valve cavity 64 is disposed in meter body 12. Valve inlet port 60 extends through meter body 12 between metering chamber 58 and valve cavity 64. Valve outlet port 62 extends out of valve cavity 64 to fluid outlet 38. Valve 50 is disposed in valve cavity 64 and controls the flow of fluid through valve cavity 64 between valve inlet port 60 and valve outlet port 62.

Valve cartridge 68 is disposed in valve cavity 64. Radial inlets 82 extend through first end 78 of cartridge body 77 proximate valve inlet port 60. Radial inlets 82 are disposed circumferentially around cartridge body 77 and provide a flow path for the metered fluid to flow into valve cartridge 68 from fluid inlet 36. Radial outlets 84 extend through second end 80 of cartridge body 77 proximate valve outlet port 62. Radial outlets 84 are disposed circumferentially around cartridge body 77 and provide a flow path for the metered fluid to flow out of valve cartridge 68 to fluid outlet 38. Valve cap 70 is attached to first end 78 of valve cartridge 68 and is configured to prevent the metered fluid from entering valve cartridge 68 through first end 78.

Valve stem 66 is disposed in valve cartridge 68. Valve stem 66 is movable between an open position, where the metered fluid can flow from valve inlet port 60 to valve outlet port 62 through valve 50, and a closed position, where the metered fluid is prevented from flowing from valve inlet port 60 to valve outlet port 62 through valve 50. Actuation tip 76 extends out of valve cavity 64 and second end 80 of valve cartridge 68 and abuts trigger 18. Stem bore 74 extends through valve stem 66 and actuation tip 76 and is exposed to atmosphere. Stem bore 74 provides a pathway for air to flow into and out of valve cartridge 68 as valve stem 66 shifts between the open position and the closed position, thereby preventing undesired pressurization within valve cartridge 68. In addition, stem bore 74 provides a leak path for the metered fluid to flow out of valve 50 and provide a visual indication of a leak between valve stem 66 and valve cartridge 68. Valve spring 72 extends from valve cap 70 into stem bore 74 of valve stem 66. Valve spring 72 is configured to exert a force on valve stem 66 to return valve stem 66 to the closed position.

Sensor 26 is disposed directly above and adjacent to meter 48. Sensor 26 can be any suitable sensor for determining the volumetric flow of the fluid passing through metering chamber 58. For example, sensor 26 can be a reed switch. Where sensor 26 is a reed switch, sensor 26 interfaces with meter 48 to count the rotation of the gears, which provides a volumetric count of the fluid passing through meter 48. Input 44 is disposed on bezel housing 20 above sensor 26. Input 44 is configured to receive commands from the user and provide those commands to meter controller 24 (FIG. 1B). Second circuit board 54 is associated with both input 44 and sensor 26 and provides electrical and communicative connections for both input 44 and sensor 26. In some examples, second circuit board 54 is attached to bezel housing 20. Having both input 44 and sensor 26 integrated into common second circuit board 54 allows for input 44 to be disposed on a portion of bezel housing 20 disposed below the remaining portion of bezel housing 20. As discussed above, positioning input 44 in-line with handle 32 and at approximately the same height as handle 32 provides increased comfort and ergonomics to the user. As such, the in-line input 44 provides the user comfortable access to input 44 while the user grasps handle 32 with a single hand. Moreover, the height of input 44 reduces strain on the hand and thumb of the user and reduces the hand movements required to manipulate input 44.

Display 46 is supported by bezel housing 20. Display 46 provides visual information regarding the fluid dispense and handheld meter 10 to the user. Display 46 is angled towards handle 32 to provide the user with an ergonomic viewing angle. As shown in FIG. 2B, display 46 is disposed at angle α relative to handle 32. Angle α can be any desired angle such that display 46 is not oriented away from the user or downward towards handle 32, such as where angle α is between 90-degrees and 180-degrees. In some examples, angle α is between 150-degrees and 170-degrees. Antenna 56 is disposed within bezel housing 20 and is configured to provide wireless communications abilities to handheld meter 10 to allow handheld meter 10 to communicate with other components within a fluid management system. First circuit board 52 is mounted within bezel housing between meter body 12 and user interface 28. The meter controller, such as meter controller 24, can be disposed on first circuit board 52, second circuit board 54, or both.

A dispense event is initiated when handheld meter 10 receives a dispense command, either from the user or from the fluid management system. The dispense command can be provided to handheld meter 10 wirelessly via antenna 56 and/or can be provided by the user via input 44. In some examples, the dispense command can include a desired volumetric count, which is the volume of the metered fluid that is to be dispensed during the dispense event. Based on the dispense command, the meter controller activates trigger control mechanism 30. In the activated position, solenoid 86 displaces plunger pin 96 into trip rod 88. Plunger pin 96 causes balls 92 to engage meter body 12, thereby locking trip rod 88 in the position shown in FIG. 2B. With trip rod 88 locked in position, trigger 18 pivots about trigger pin 94. Depressing trigger 18 thus causes valve stem 66 to shift upwards within valve cartridge 68 to the open position, opening a flow path through valve 50.

The metered fluid enters handheld meter 10 through fluid inlet 36, flows through metering chamber 58, and flows into valve inlet port 60. In examples where meter 48 is a gear meter, the flow of the metered fluid causes the gears of meter 48 to rotate, and sensor 26 counts the rotations of the gears. Because the volume of fluid flowing through the gears with each rotation is known, the meter controller can generate a volumetric count based on the information provided by sensor 26. The meter controller tracks the volumetric count and, in some examples, is configured to deactivate trigger control mechanism 30 when the actual volumetric count provided by sensor 26 reaches the desired volumetric count. The meter controller can provide information regarding the dispense event to the user via display 46.

The metered fluid flows into valve cavity 64 from valve inlet port 60. The fluid enters valve cartridge 68 through radial inlets 82, flows around valve stem 66, and exits valve cartridge 68 through radial outlets 84. The meter fluid exits valve cavity 64 through valve outlet port 62 and flows downstream out of meter body 12 through fluid outlet 38.

When the volumetric count reaches the desired volumetric count, the meter controller deactivates trigger control mechanism 30, preventing any additional, unauthorized fluid dispensing. Solenoid 86 retracts plunger pin 96, thereby unlocking trip rod 88 such that trip rod 88 can freely slide within meter body 12. Reset spring 90 exerts an upward force on trip rod 88, which assists solenoid 86 in the removal of plunger pin 96 from trip rod 88. In some examples, reset spring 90 is preloaded to decrease the force solenoid 86 is required to exert to retract plunger pin 96. In some examples, reset spring 90 has a preload of about 10 N-15 N. In one example, reset spring 90 has a preload of about 12.8 N. With trip rod 88 unlocked, trigger 18 no longer pivots about trigger pin 94. Instead, depressing trigger 18 causes trigger 18 to pull trip rod 88 downwards within meter body 12, and trigger 18 pivots about actuation tip 76. Shifting the pivot point of trigger 18 from trigger pin 94 to actuation tip 76 prevents trigger 18 from exerting the necessary force on valve stem 66 that is required to shift valve stem 66 from the closed position to the open position.

When replacement of valve 50 is desired, trigger 18 must be removed from meter body 12 prior to replacing valve 50. Elastomeric trigger guard 22 facilitates quick and simple removal and replacement of valve 50. To replace valve 50, fastener 98 is removed and elastomeric trigger guard 22 is pulled off of meter body 12. With elastomeric trigger guard 22 removed, trigger pin 94 is exposed to the user. The user can knock trigger pin 94 out, such that trigger 18 is no longer attached to trip rod 88. With trigger pin 94 removed, trigger 18 can then be pulled off of meter body 12. The user then has access to valve 50 and valve 50 can be removed and replaced. During replacement of valve 50, the user typically sets meter body 12 in an upside down orientation to have access to valve 50. With meter body 12 in the upside down orientation, the metered fluid can pool in valve cavity 64. When a replacement valve 50 is installed, valve cap 70 prevents the metered fluid from entering into first end 78 of valve cartridge 68. If the metered fluid were to enter first end 78 of valve cartridge 68, then that metered fluid could migrate through stem bore 74 and leak out of actuation tip 76, which would provide a false-positive indication of a leak to the user, even though a leak does not exist. Valve cap 70 prevents that pooled metered fluid from entering first end 78 of valve cartridge 68, and as such, valve cap 70 eliminates false-positive leak indications that could occur during replacement of valve 50.

Figure 3A:
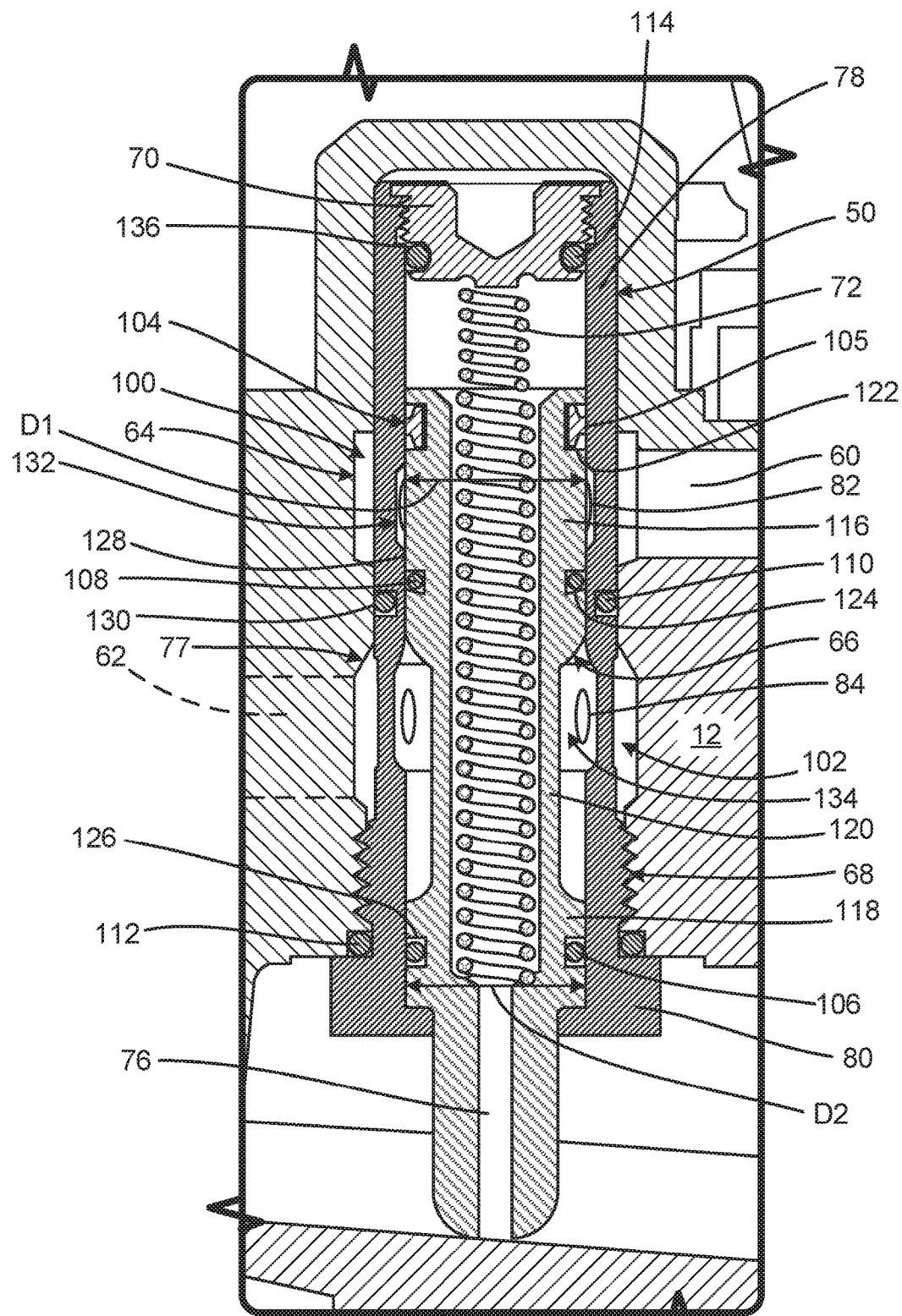
FIG. 3A is a cross-sectional view of a valve in a closed position.
Figure 3B:
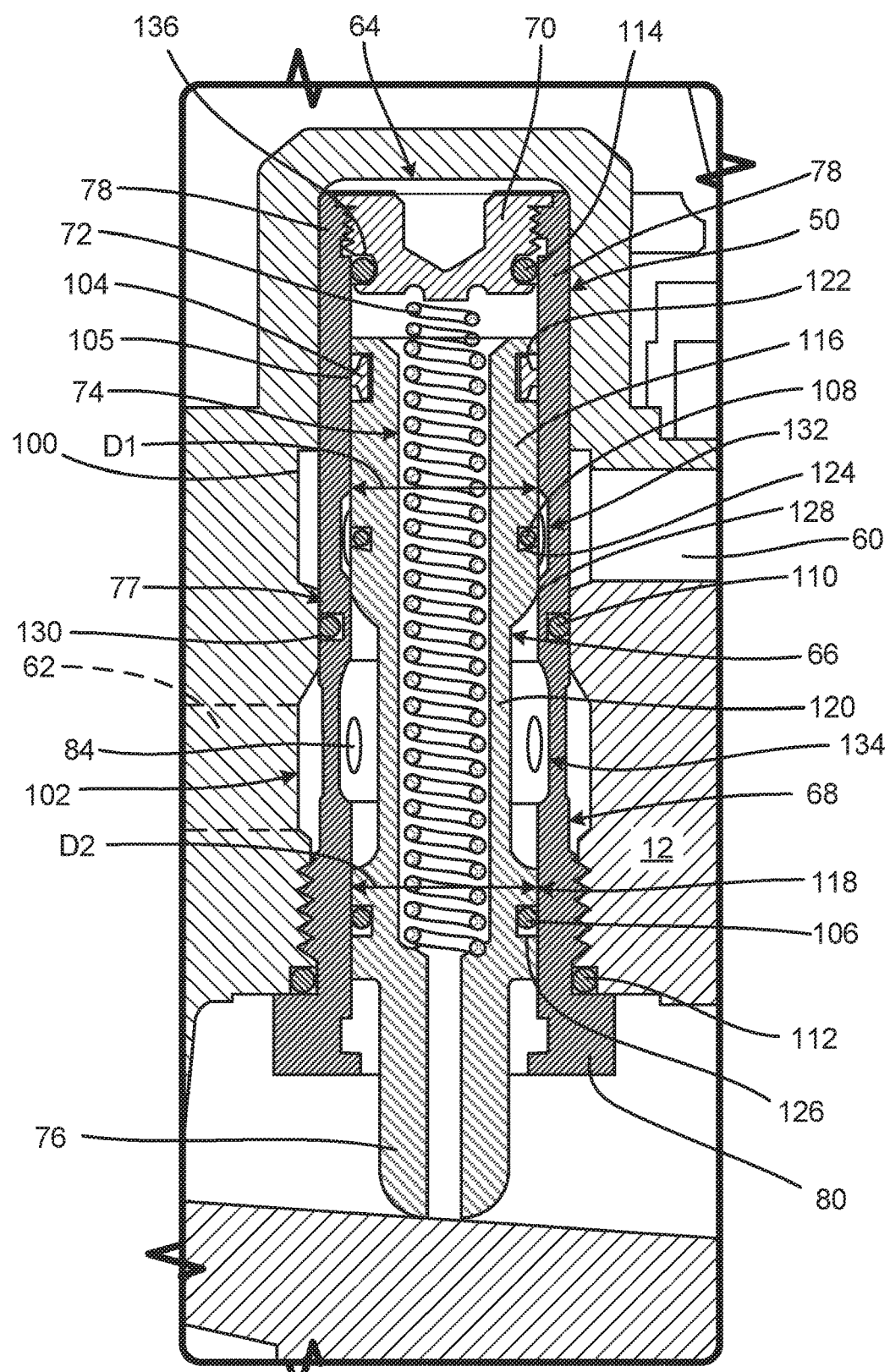
FIG. 3B is a cross-sectional view of a valve in a modulated position.
Figure 3C:
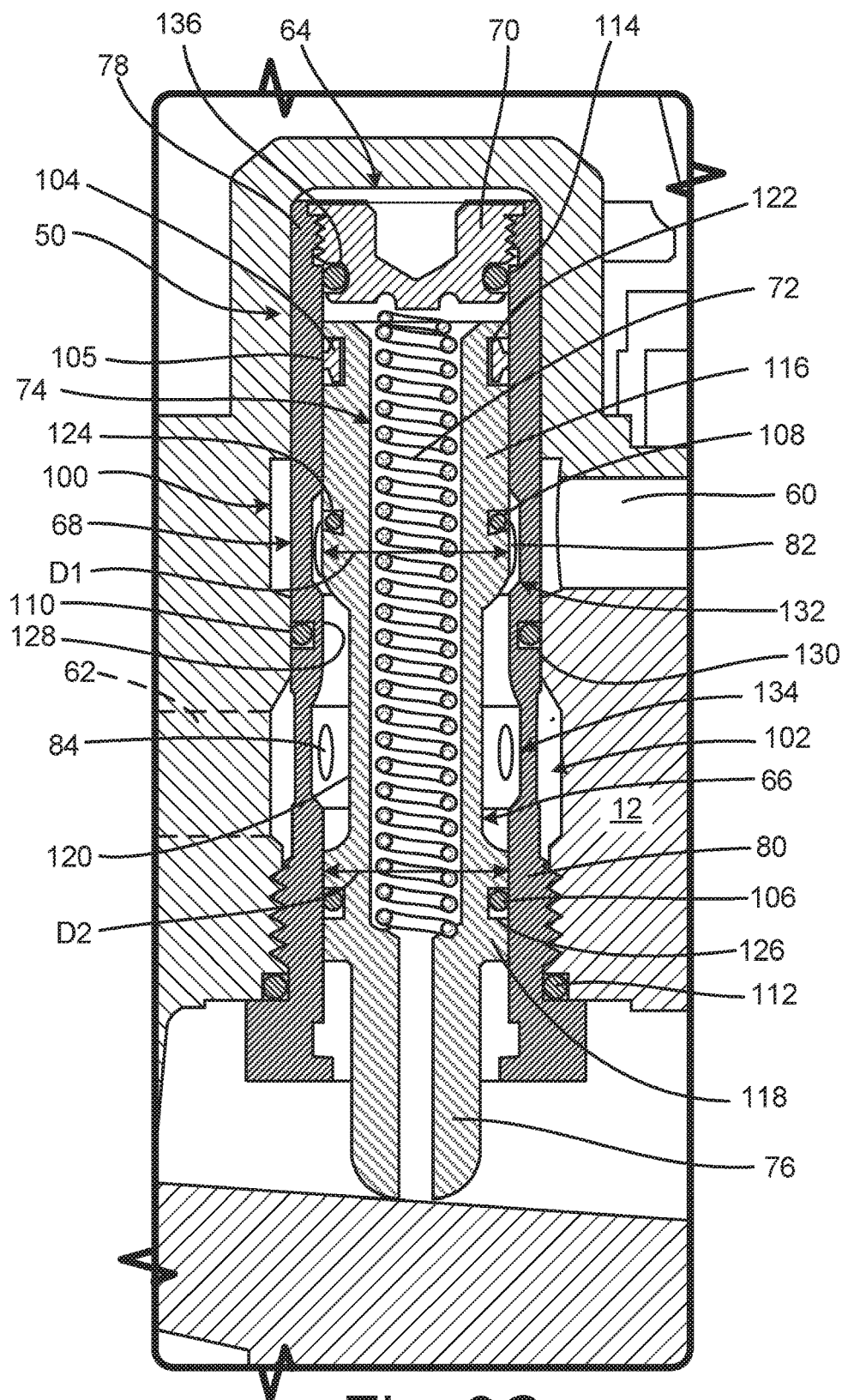
FIG. 3C is a cross-sectional view of a valve in an open position.
Figure 3D:
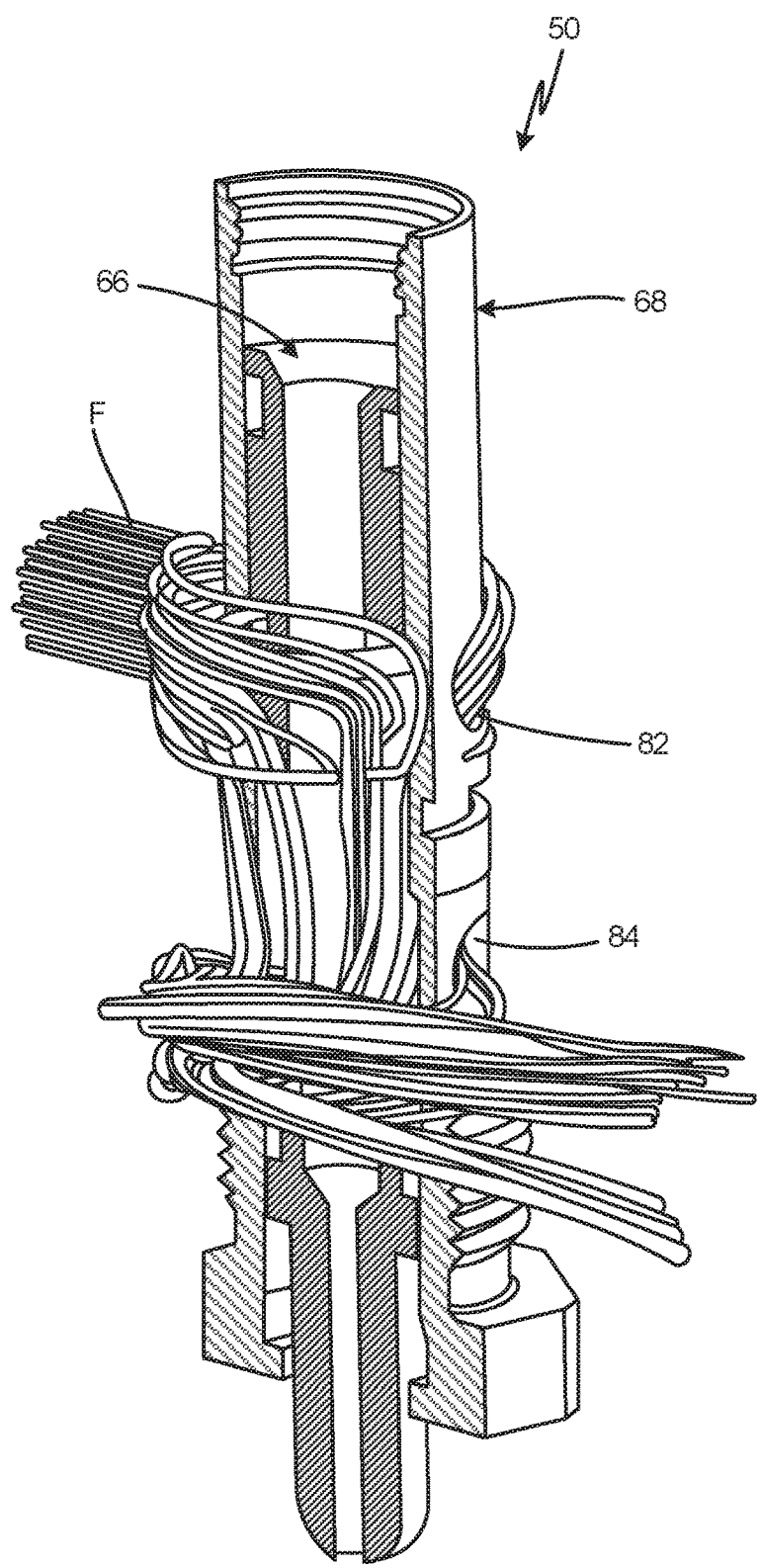
FIG. 3D is a cross-sectional, perspective view of a valve showing fluid flow lines.

FIG. 3A is a cross-sectional view of valve 50 in the closed position. FIG. 3B is a cross-sectional view of valve 50 in a throttled position. FIG. 3C is a cross-sectional view of valve 50 in an open position. FIG. 3D is a cross-sectional, perspective view of valve 50 showing flow lines F. FIGS. 3A-3D will be discussed together. Valve inlet port 60, valve outlet port 62, and valve cavity 64 of meter body 12 are shown in FIGS. 3A-3C. Valve cavity 64 includes first exterior circumferential flow passage 100 and second exterior circumferential flow passage 102. Valve 50 includes valve stem 66, valve cartridge 68, valve cap 70, valve spring 72, first dynamic seal 104, second dynamic seal 106, control seal 108, static seal 110, static seal 112, and cap seal 114. First dynamic seal 104 includes projection 105. Valve stem 66 includes stem bore 74, actuation tip 76, upper portion 116, lower portion 118, and elongate portion 120. Upper portion 116 includes first dynamic seal groove 122 and control seal groove 124, and upper portion 116 has diameter D1. Lower portion 118 includes second dynamic seal groove 126 and has diameter D2. Valve cartridge 68 includes cartridge body 77, and cartridge body 77 includes first end 78, second end 80, radial inlets 82, radial outlets 84, control seat 128, static seal groove 130, first interior circumferential flow passage 132, and second interior circumferential flow passage 134. Valve cap 70 includes cap seal groove 136.

Valve inlet port 60 extends through meter body 12 into valve cavity 64. Valve outlet port 62 extends from valve cavity 64 through meter body 12. First exterior circumferential flow passage 100 extends about valve cavity 64 proximate valve inlet port 60. Second exterior circumferential flow passage 102 extends about valve cavity 64 proximate valve outlet port 62. Valve 50 is disposed within valve cavity 64.

Valve cartridge 68 extends into valve cavity 64. In some examples, valve cartridge 68 is machined from bar stock, such as steel bar stock. First interior circumferential flow passage 132 extends around an interior of first end 78 of cartridge body 77. Radial inlets 82 extend through first end 78 of cartridge body 77 between first exterior circumferential flow passage 100 and first interior circumferential flow passage 132. Second interior circumferential flow passage 134 extends around an interior of second end 80 of cartridge body 77. Radial outlets 84 extend through second end 80 of cartridge body 77 between second exterior circumferential flow passage 102 and second interior circumferential flow passage 134. In some examples, valve cartridge 68 includes a plurality of radial inlets 82 and radial outlets 84, each extending circumferentially about valve cartridge 68. In one example, valve cartridge 68 includes six radial inlets 82 and six radial outlets 84, but it is understood that valve cartridge 68 can include as many or as few radial inlets 82 and radial outlets 84 as desired. Control seat 128 is an annular projection extending from an interior of cartridge body 77. Control seat 128 is disposed between first interior circumferential flow passage 132 and second interior circumferential flow passage 134. Control seat 128 provides a seat for control seal 108 to seal against when valve 50 is in the closed position.

Static seal groove 130 extends around an exterior of cartridge body 77 between first end 78 and second end 80. Static seal 110 is disposed in static seal groove. Static seal 110 prevents the metered fluid from leaking around cartridge body 77 between first exterior circumferential flow passage 100 and second exterior circumferential flow passage 102. Second end 80 of valve cartridge 68 is connected to meter body 12 to secure valve cartridge 68 within valve cavity 64. In some examples, second end 80 includes external threading configured to mate with internal threading on meter body 12. While valve cartridge 68 is described as connected to meter body 12 by interfaced threading, it is understood that valve cartridge 68 can be secured to meter body 12 in any suitable manner, such as a snap-fit connection. Static seal 112 extends around second end 80 between valve cartridge 68 and meter body 12. Static seal 112 prevents the metered fluid from leaking out of valve cavity 64 around second end 80.

Valve stem 66 is disposed within valve cartridge 68. Upper portion 116 is disposed within first end 78, and lower portion 118 is disposed within second end 80. Elongate portion 120 extends between and connects upper portion 116 and lower portion 118. Actuation tip 76 extends from lower portion 118 out of second end 80. Stem bore 74 extends through upper portion 116, elongate portion 120, lower portion 118, and actuation tip 76; and stem bore 74 is open to atmosphere. Upper portion 116 has first diameter D1 and lower portion 118 has second diameter D2. First diameter D1 is the same as second diameter D2, such that the pressure forces exerted on both upper portion 116 and lower portion 118 by the metered fluid are balanced.

First dynamic seal groove 122 extends around upper portion 116. First dynamic seal 104 is disposed in first dynamic seal groove 122 and is configured to provide a seal between upper portion 116 and cartridge body 77. First dynamic seal groove 122 is disposed above first interior circumferential flow passage 132, and first dynamic seal 104 maintains engagement with cartridge body 77 when valve stem 66 is in the open position, the closed position, and any intermediate position there between. First dynamic seal 104 includes projection 105 that extends from first dynamic seal 104 and contacts cartridge body 77. Projection 105 provides increased resistance to rolling deformation to first dynamic seal 104. The reduction of rolling deformation prevents running leakage around first dynamic seal 104 as valve stem 66 reciprocates within valve cartridge 68.

Second dynamic seal groove 126 extends around lower portion 118. Second dynamic seal 106 is disposed in second dynamic seal groove 126 and is configured to provide a seal between lower portion 118 and cartridge body 77. Second dynamic seal 106 is disposed below second interior circumferential flow passage 134. Second dynamic seal 106 maintains engagement with cartridge body 77 when valve stem 66 is in the open position, the closed position, or any intermediate position there between. In some examples, second dynamic seal 126 is configured similar to first dynamic seal 122, such that second dynamic seal 126 also includes a projection, such as projection 105, to increase resistance to rolling deformation.

Control seal groove 124 extends around upper portion 116 below first dynamic seal groove 122. Control seal 108 is disposed in control seal groove 124 and is configured to provide a seal between valve stem 66 and valve cartridge 68. Control seal 108 is configured to control the flow of meter fluid through valve 50. Control seal 108 engages control seat 128 when valve 50 is in the closed position, preventing flow between first interior circumferential flow passage 132 and second interior circumferential flow passage 134. Control seal 108 is disengaged from control seat 128 when valve 50 is in the open position, allowing flow between first interior circumferential flow passage 132 and second interior circumferential flow passage 134. In some examples control seal 108 in an o-ring.

Valve cap 70 is connected to first end 78 of valve cartridge 68. Cap seal groove 136 extends around valve cap 70. Cap seal 114 is disposed in cap seal groove 136 and is configured to provide a seal between valve cap 70 and valve cartridge 68. Cap seal 114 prevents fluid from leaking from fluid inlet 60 to valve passage 74 and into first end 78 of valve cartridge 68 around valve cap 70. As discussed above, valve cap 70 prevents any pooled metered fluid within valve cavity 64 from entering valve cartridge 68 through first end 78 during replacement of valve 50. As such, valve cap 70 eliminates leak false-positives from occurring during replacement of valve 50.

Valve spring 72 extends from valve cap 70 and into stem bore 74. Valve spring 72 exerts a force on valve stem 66 to bias valve stem 66 towards the closed position.

During operation, valve 50 is modulated between the closed position, shown in FIG. 3A, and the open position, shown in FIG. 3C. Valve stem 66 is initially in the closed position shown in FIG. 3A. With valve stem 66 in the closed position, control seal 108 engages control seat 128 and prevents the meter fluid from flowing through valve 50. Both first dynamic seal 104 and control seal 108 are subjected to the fluid pressure upstream of valve 50 when valve stem 66 is in the closed position. Second dynamic seal 106 is isolated from the upstream fluid pressure with valve stem 66 in the closed position, such that second dynamic seal 106 is not subjected to the upstream fluid pressure when valve stem 66 is in the closed position.

When a dispense event is initiated, the trigger, such as trigger 18 (best seen in FIGS. 2A-2B) is depressed causing valve stem 66 to shift upward within valve cartridge 68. Valve stem 66 initially shifts to the throttled position shown in FIG. 3B. With valve stem 66 in the throttled position, control seal 108 is disengaged from control seat 128 and is disposed in the flow path of the fluid entering valve cartridge 68 through radial inlets 82. As discussed in more detail below with regard to FIGS. 4A-4C, with valve stem 66 in the throttled position a restricted flow path opens between upper portion 116 and valve cartridge 68. The restricted flow path limits the velocity of the metered fluid flowing through valve 50 and impinging on control seal 108. Limiting the fluid velocity when control seal 108 is directly in the fluid flow path through radial inlets 82 prevents the metered fluid from displacing control seal 108 out of control seal groove 124.

Valve stem 66 continues to displace upwards within valve cartridge 68 to the fully open position shown in FIG. 3C. In the fully open position, control seal 108 is offset from and disposed above radial inlets 82 such that a portion of valve cartridge 68 shields control seal 108 from the direct flow path of the metered fluid. Valve cartridge 68 shielding control seal 108 from the full fluid velocity prevents undesired displacement of control seal 108 out of control seal groove 124.

The metered fluid enters first exterior circumferential flow passage 100 from valve inlet port 60 and flows circumferentially around first end 78 of cartridge body 77 within first exterior circumferential flow passage 100. The metered fluid flows into first interior circumferential flow passage 132 through radial inlets 82. As shown in FIG. 3D, first exterior circumferential flow passage 100 ensures balanced circumferential flow around first end 78 of cartridge body 77, and first interior circumferential flow passage 132 ensures balanced circumferential flow around valve stem 66. Ensuring balanced circumferential flow provides an even pressure distribution about control seal 108. As such, control seal 108 experiences similar flow velocities regardless of the angular position of the flow on control seal 108. First exterior circumferential flow passage 100 and first interior circumferential flow passage 132 thus allow for consistent external pressure on control seal 108, preventing displacement of control seal 108 out of control seal groove 124.

The metered fluid flows downstream from first interior circumferential flow passage 132 to second interior circumferential flow passage 134. The metered fluid flows from second interior circumferential flow passage 134 to second exterior circumferential flow passage 102 through radial outlets 84, and the metered fluid flows out of second exterior circumferential flow passage 102 through valve outlet port 62. Similar to first exterior circumferential flow passage 100 and first interior circumferential flow passage 132, second exterior circumferential flow passage 102 and second interior circumferential flow passage 134 provide an even distribution of flow through valve 50, thereby providing balanced pressure and flow velocity.

First exterior circumferential flow passage 100, first interior circumferential flow passage 132, second interior circumferential flow passage 134, and second exterior circumferential flow passage 102 thus provide an even annular distribution of fluid flow lines F through valve 50, such that the metered fluid flows around the full circumference of valve cavity 64 and valve cartridge 68, rather than through a direct path connecting valve inlet port 60 and valve outlet port 62.

With valve stem 66 in the fully open position, both first dynamic seal 104 and second dynamic seal 106 experience the fluid pressure of the meter fluid. After the fluid dispense ends, valve stem 66 shifts back to the closed position shown in FIG. 3A. Valve spring 72 exerts a downward force on valve stem 66 to drive valve stem 66 to the closed position. Upper diameter D1 is the same as lower diameter D2 such that the fluid pressure acting on first dynamic seal 104 and upper portion 116 is balanced with the fluid pressure acting on second dynamic seal 106 and lower portion 118. Balancing the pressure forces on first dynamic seal 104 and second dynamic seal 106 creates a pressure equilibrium, eliminating pressure imbalance on valve stem 66. The balanced pressure forces ensure that valve spring 72 can shift valve stem 66 to the closed position under all rated operating conditions.

Throughout operation valve stem 66 is retained within and guided by cartridge body 77. First dynamic seal 104, control seal 108, and second dynamic seal 106 are all configured to extend between valve stem 66 and valve cartridge 68. Guiding valve stem 66 with cartridge body 77 provides enhanced seal alignment, as valve stem 66 is not guided by multiple parts having multiple diameters. In addition, having first dynamic seal 104 seal on valve cartridge 68, which is machined from bar stock, prevents running leaks around first dynamic seal 104 as first dynamic seal 104 does not seal against a cast member, such as meter body 12.

Valve 50 provides significant advantages. The fluid velocity through valve 50 is maintained below a maximum level until control seal 108 is out of the direct flow path of the metered fluid, preventing undesired displacement of control seal 108 from control seal groove 124. First exterior circumferential flow passage 100, first interior circumferential flow passage 132, second interior circumferential flow passage 134, and second exterior circumferential flow passage 102 ensure that the metered fluid flows around the full circumference of valve cartridge 68 and valve stem 66, providing balanced forces on control seal 108 regardless of angular position. Projection 105 extends from first dynamic seal 104 and reduces rotational flexing, which reduces running leakage around first dynamic seal 104. Valve cap 70 prevents fluid from entering valve cartridge 68 through first end 78, which eliminates false-positive leak indications from appearing during replacement of valve 50. Upper diameter D1 is equal to lower diameter D2, such that the pressure forces on first dynamic seal 104 and second dynamic seal 106 are balanced when valve 50 is in the open position. The balanced forces ensure that valve spring 72 can drive valve stem 66 to the closed position under all rated operating conditions. Cartridge body 77 provides the only sealing surface for first dynamic seal 104, control seal 108, and second dynamic seal 106, which provides better seal alignment as valve stem 66 is guided by a single part.

Figure 4A:
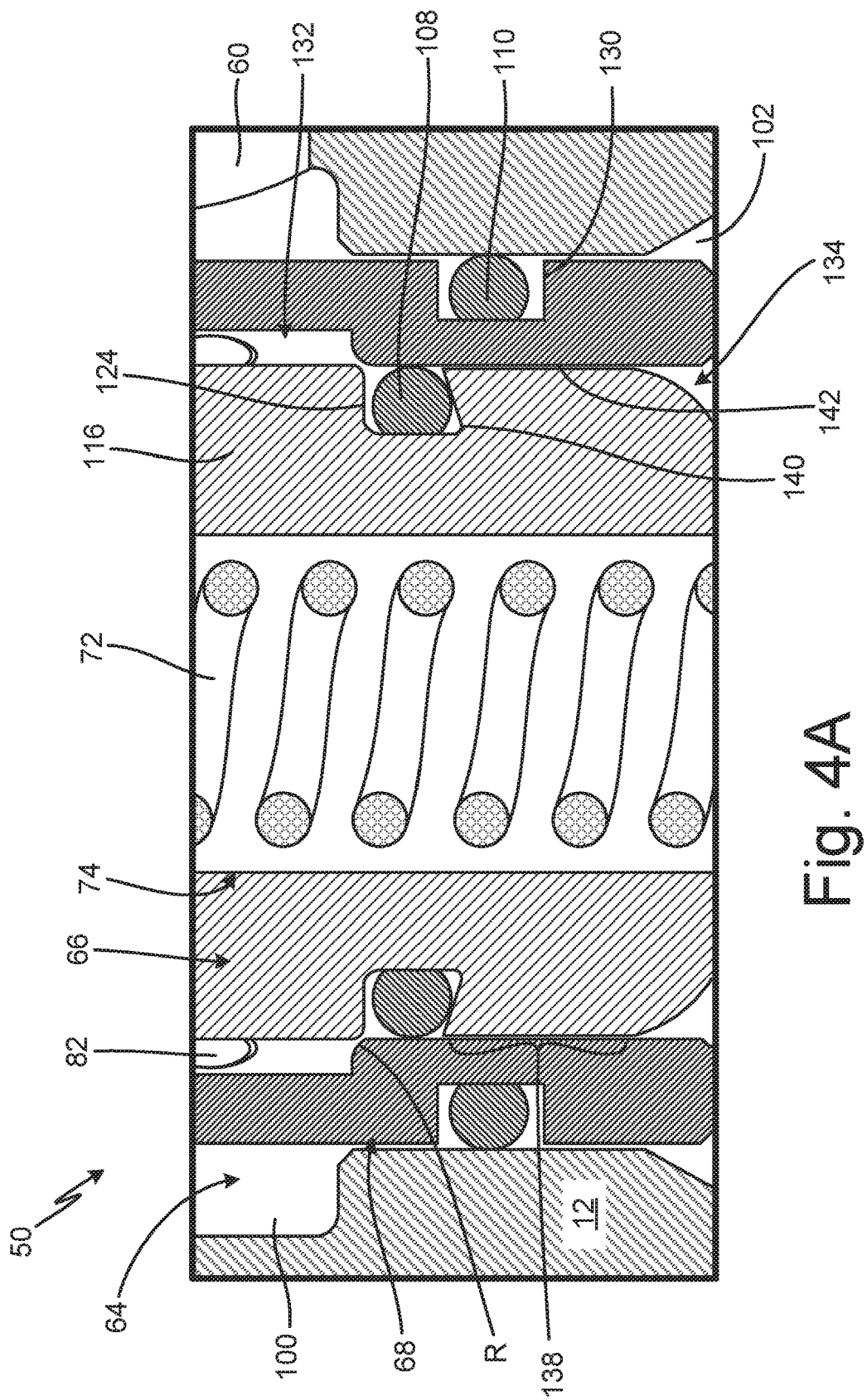
FIG. 4A is a cross-sectional view of a cartridge valve showing a control seal in a closed position.
Figure 4B:
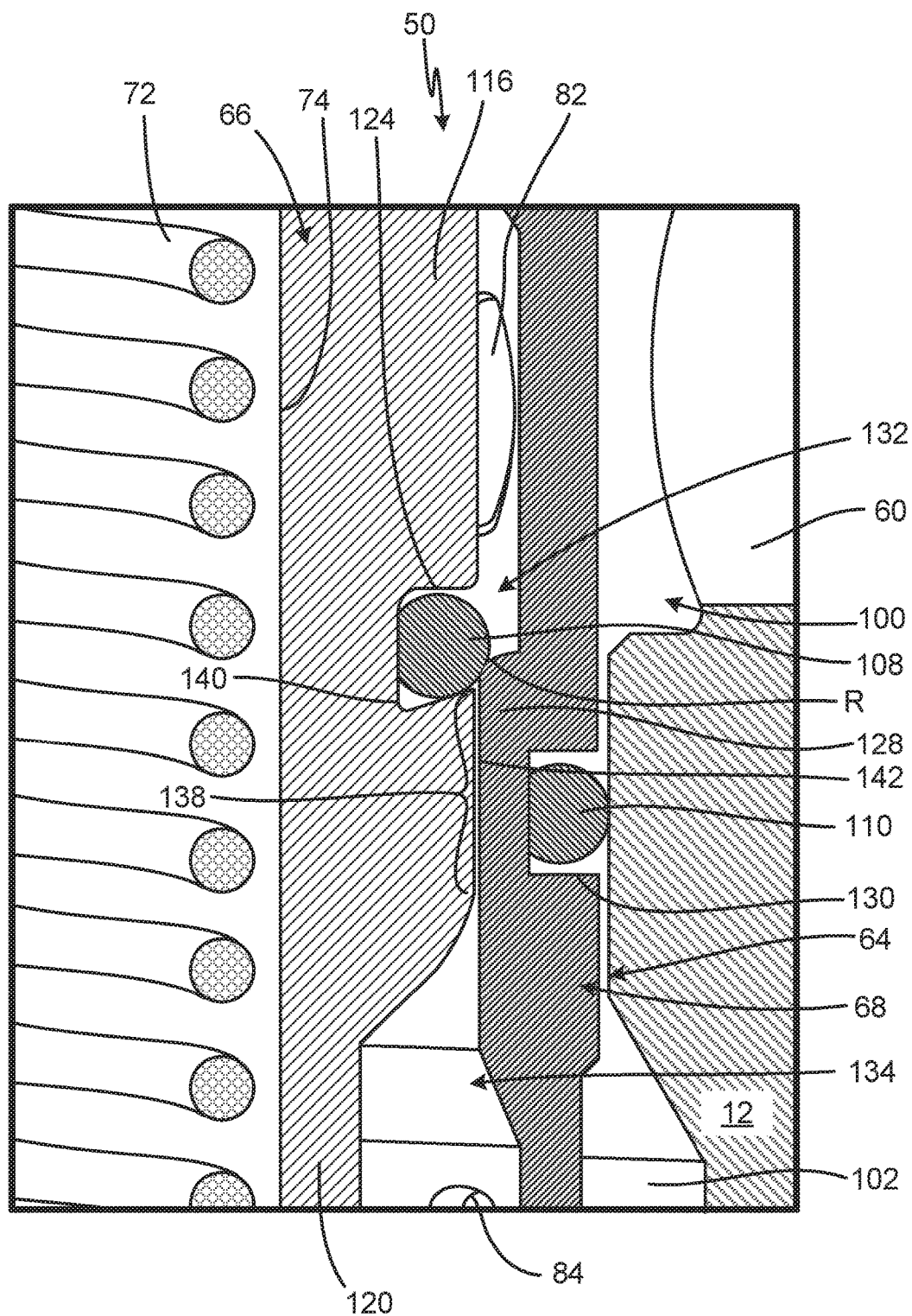
FIG. 4B is a cross-sectional view of a cartridge valve showing a control seal in a modulated position.
Figure 4C:
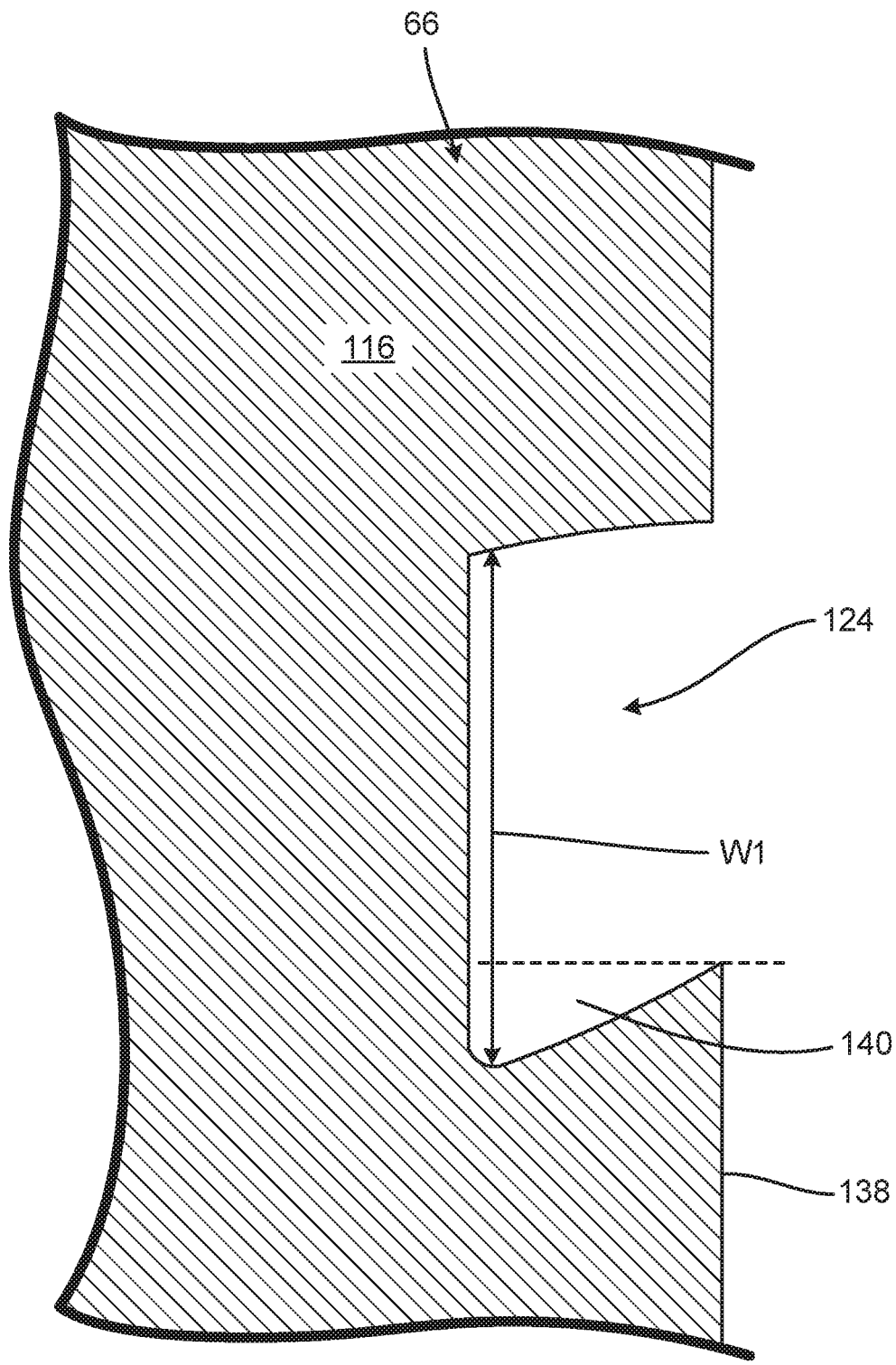
FIG. 4C is a cross-sectional view of a control seal groove.

FIG. 4A is an enlarged cross-sectional view of control seal 108 with valve 50 in a closed position. FIG. 4B is an enlarged cross-sectional view of control seal 108 with valve 50 in a modulated position. FIG. 4C is a cross-sectional view of control seal groove 124. FIGS. 4A-4C will be discussed together. Valve inlet port 60 and valve cavity 64 of meter body 12 are shown. First exterior circumferential flow passage 100 and second exterior circumferential flow passage 102 of valve cavity 64 are shown. Valve stem 66, valve cartridge 68, valve spring 72, control seal 108, and static seal 110 of valve 50 are shown. Upper portion 116, elongate portion 120 (FIG. 4B), and stem bore 74 of valve stem 66 are shown, and upper portion 116 includes control seal groove 124 and throttling portion 138. Control seal groove 124 includes dovetail 140, and dovetail 140 has width W1 (FIG. 4C). Radial inlet 82, radial outlet 84 (FIG. 4B), control seat 128, static seal groove 130, first interior circumferential flow passage 132, and second interior circumferential flow passage 134 of valve cartridge 68 are shown. Control seat 128 includes seat radius R.

Valve stem 66 is disposed in valve cartridge 68 and is movable between the open position and the closed position. Control seal groove 124 extends into upper portion 116, and control seal 108 is disposed in control seal groove 124. Dovetail 140 extends from a downstream side of control seal groove 124 such that control seal groove 124 presents a partial dovetail. Width W1 is a width of control seal groove 124 at dovetail 140. Width W1 is preferably about 0.178 cm (0.070 in.), which in one example is approximately the same as a cross-sectional diameter of control seal 108. In some examples, a ratio of the cross-sectional diameter of control seal 108 to width W1 is between about 1:0.9 and 1:1.1. In one example, the ratio of the cross-sectional diameter of control seal 108 to width W1 about 1:1. Dovetail 140 ensures that control seal 108 remains seated in control seal groove 124 throughout all rated operating conditions. Throttling portion 138 is a part of upper portion 116 that extends below control seal groove 124.

Static seal groove 130 extends about an exterior of valve cartridge 68. Static seal groove 130 is disposed between first exterior circumferential flow passage 100 and second exterior circumferential flow passage 102. Static seal 110 is disposed in static seal groove 130 and is configured to provide a seal at the interface of valve cartridge 68 and meter body 12. Control seat 128 extends from an interior of valve cartridge 68 and is disposed between first interior circumferential flow passage 132 and second interior circumferential flow passage 134. Control seat 128 provides a sealing surface for control seal 108.

During operation, valve stem 66 is modulated between a closed position, where control seal 108 is engaged with control seat 128, and an open position, where control seat 128 is disengaged from control seat 128. Control seal 108 is initially in the closed position shown in FIG. 4A, such that control seal 108 is disposed between valve stem 66 and control seat 128 to prevent any metered fluid from flowing between first interior circumferential flow passage 132 and second interior circumferential flow passage 134. To initiate a fluid dispense, valve stem 66 shifts upwards until control seal 108 disengages from control seat 128. When control seal 108 initially disengages from control seat 128, annular flow path 142 is opened between throttling portion 138 and control seat 128. Annular flow path 142 provides a restricted area for the metered fluid to flow between first interior circumferential flow passage 132 and second interior circumferential flow passage 134. The restricted area created by annular flow path 142 limits the initial flow velocity of the metered fluid through valve 50.

The length of annular flow path 142 decreases as valve stem 66 continues to shift upwards to the fully open position (shown in FIG. 3C). As the length of annular flow path 142 decreases, the flow velocity of the meter fluid flowing into first interior circumferential flow passage 132 and through annular flow path 142 simultaneously increases. As such, annular flow path 142 provides flow feathering for precise flow control. For example, the further the user depresses the trigger, the greater the flow velocity through valve 50. The flow feathering provided by annular flow path 142 allows the user to precisely and consistently top-off the dispensed metered fluid during a dispense event. During a top-off, valve stem 66 is slightly opened and closed to dispense small amounts of fluid to bring the actual dispense volume up to the desired dispense volume.

Throttling portion 138 is offset from control seat 128 when valve stem 66 is in the fully open position. With valve stem 66 in the fully open position, a non-restricted flow path is created between first interior circumferential flow passage 132 and second interior circumferential flow passage 134. Throttling portion 138 is sized to disengage from control seat 128 when control seal 108 is disposed above radial inlets 82 such that control seal 108 is at least partially shielded from the full fluid velocity by valve cartridge 68. As such, control seal 108 is not disposed in the direct flow path of the metered fluid when valve stem 66 is in the fully open position.

At the end of the dispense event valve stem 66 returns to the closed position. As valve stem 66 transitions to the closed position, control seal 108 initially engages control seat 128 at control seat radius R. In some examples, a ratio of control seat radius R to a cross-sectional radius of control seal 108 is 1:2-1:10. In one example, the ratio of control seat radius R to the cross-sectional radius of control seal 108 is about 1:3. Control seat radius R allows control seal 108 to pop in and pop out of sealing engagement with control seat 128, preventing control seal 108 from experiencing scarfing caused by deformation of control seal 108 at control seat 128. This further prevents high-velocity fluid flow seal erosion as control seal 108 is not itself controlling the fluid velocity. Control seal 108 thus provides poppet-style flow control. When control seal 108 is engaged with control seat 128 flow is shut off. When control seal 108 is disengaged from control seat 128 flow proceeds. Control seal 108 does not throttle flow; instead, annular flow path 142 provides all flow throttling through valve 50. As annular flow path 142 controls the flow velocity, control seal 108 is less susceptible to high-velocity fluid flow erosion.

Valve 50 provides significant advantages. Annular flow path 142 provides flow feathering as valve stem 66 shifts from the closed position to the open position. Annular flow path 142 also maintains the flow velocity below the maximum flow velocity until control seal 108 is out of the direct path of the meter fluid. Control seat radius R prevents scarfing of control seal 108 as control seal 108 transitions between the open position and the closed position. Dovetail 140 prevents displacement of control seal 108 from control seal groove 124.

Figure 5A:
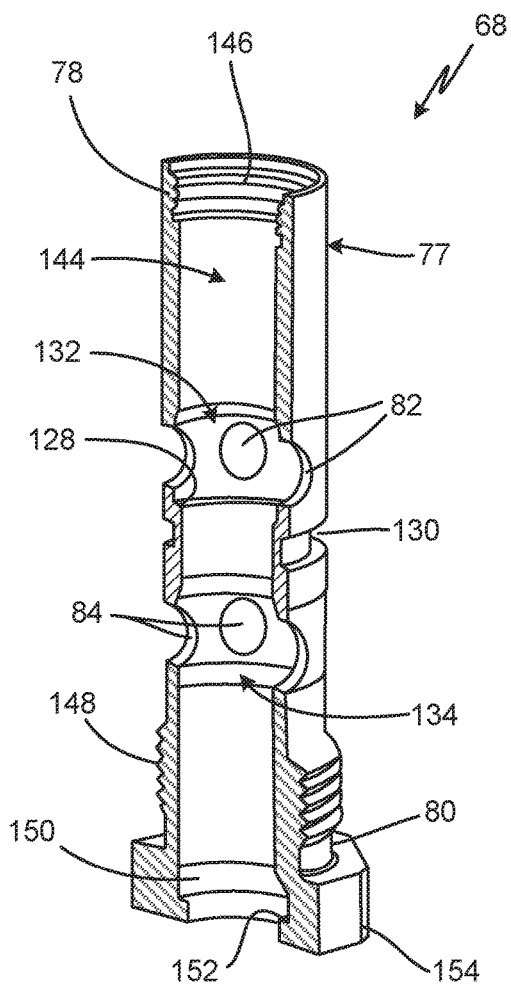
FIG. 5A is a first cross-sectional view of a valve cartridge.
Figure 5B:
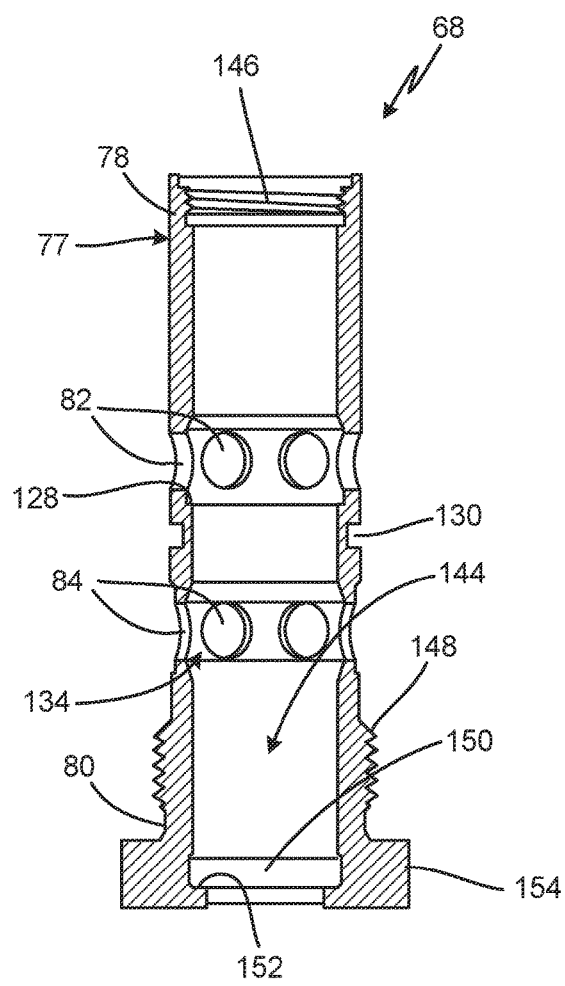
FIG. 5B is a second cross-sectional view of a valve cartridge.

FIG. 5A is a first cross-sectional view of valve cartridge 68. FIG. 5B is a second cross-sectional view of valve cartridge 68. FIGS. 5A and 5B will be discussed together. Valve cartridge 68 includes cartridge body 77, first end 78, second end 80, radial inlets 82, radial outlets 84, control seat 128, static seal groove 130, first interior circumferential flow passage 132, second interior circumferential flow passage 134, and cartridge bore 144. First end 78 includes interior threads 146. Second end 80 includes exterior threads 148, undercut 150, valve stem bearing surface 152, and cartridge flange 154.

Cartridge bore 144 extends through cartridge body 77 from first end 78 to second end 80. Interior threads 146 are disposed at a distal end of first end 78 and are configured to interface with exterior threads on a valve cap, such as valve cap 70 (best seen in FIGS. 3A-3C), to retain the valve cap on valve cartridge 68. Radial inlets 82 extend through cartridge body 77 into first interior circumferential flow passage 132. Radial outlets 84 extends through cartridge body 77 into second interior circumferential flow passage 134. Control seat 128 extends into cartridge bore 144 from an interior of cartridge body 77 and is disposed between first interior circumferential flow passage 132 and second interior circumferential flow passage 134. Static seal groove 130 extends around an exterior of cartridge body 77 between radial inlets 82 and radial outlets 84, and static seal groove 130 is configured to receive a seal, such as static seal 110 (best seen in FIGS. 4A-4B).

Cartridge flange 154 extends radially from second end 80. Cartridge flange 154 is configured to abut an exterior of a meter body, such as meter body 12 (best seen in FIG. 2B), when valve cartridge 68 is installed in the meter body. Exterior threads 148 extend around second end 80 above cartridge flange 154. Exterior threads 148 are configured to interface with interior threads on the meter body to secure valve cartridge 68 to the meter body. Valve stem bearing surface 152 extends into second end 80. Valve stem bearing surface 152 limits downward movement of a valve stem, such as valve stem 66 (best seen in FIGS. 3A-3C), disposed in valve cartridge 68. The valve stem rests against valve stem bearing surface 152 when the valve is in the closed position. Undercut 150 extends into an interior of cartridge body 77 adjacent valve stem bearing surface 152. In some examples, valve cartridge 68 is machined from a bar stock, such as steel. Undercut 150 facilitates dimensional control and surface finishing on the interior of cartridge bore 144 during the manufacture of valve cartridge 68.

FIG. 6 is an enlarged cross-sectional view of bezel housing 20 and display 46. Bezel housing 20 includes display opening 156, and display opening 156 includes edges 158. Display 46 includes upper retainer 160, lower retainer 162, first pad 164, second pad 166, and display screen 168.

First circuit board 52, antenna 56, and solenoid 86 are disposed within bezel housing 20. Solenoid 86 extends at least partially into meter body 12, which facilitates a lower profile of bezel housing 20. Antenna 56 is configured to provide wireless communication for a meter controller, such as meter controller 24 (FIG. 1B). First circuit board 52 and second circuit board 54 (best seen in FIG. 2B) can include various electrical components, such as the meter controller, configured to control operation of handheld meter 10 (best seen in FIG. 1A).

Display 46 is mounted to bezel housing 20 within display opening 156. Display 46 is tilted towards the user at angle α. As discussed above, angle α can be any desired angle between 90-degrees and 180-degrees. In one example, angle α is between 150-degrees and 170-degrees. Display screen 168 is disposed between first pad 164 and second pad 166. In some examples, display screen 168 is an LCD. Both first pad 164 and second pad 166 can include adhesive backing. Upper retainer 160 is connected to lower retainer 162, and upper retainer 160 and lower retainer 162 encapsulate first pad 164, second pad 166, and display screen 168. Upper retainer 160 is clear, to allow the user to view the images provided by display screen. In some examples, lower retainer 162 is also clear. For example, both upper retainer 160 and lower retainer 162 can be polycarbonate. Upper retainer 160 is attached to bezel housing 20 to secure display 46 in position in display opening 156. In some examples, upper retainer 160 can be mounted to bezel housing 20 with a double sided acrylic foam tape, such as 3M® VHB™ tape.

Edges 158 of display opening 156 are elevated relative to display 46 when display 46 is mounted in bezel housing 20. Elevating edges 158 of display opening 156 relative to display 46 protects display 46 from experiencing an impact force if handheld meter 10 is dropped or otherwise experiences an impact.

Figure 7C:
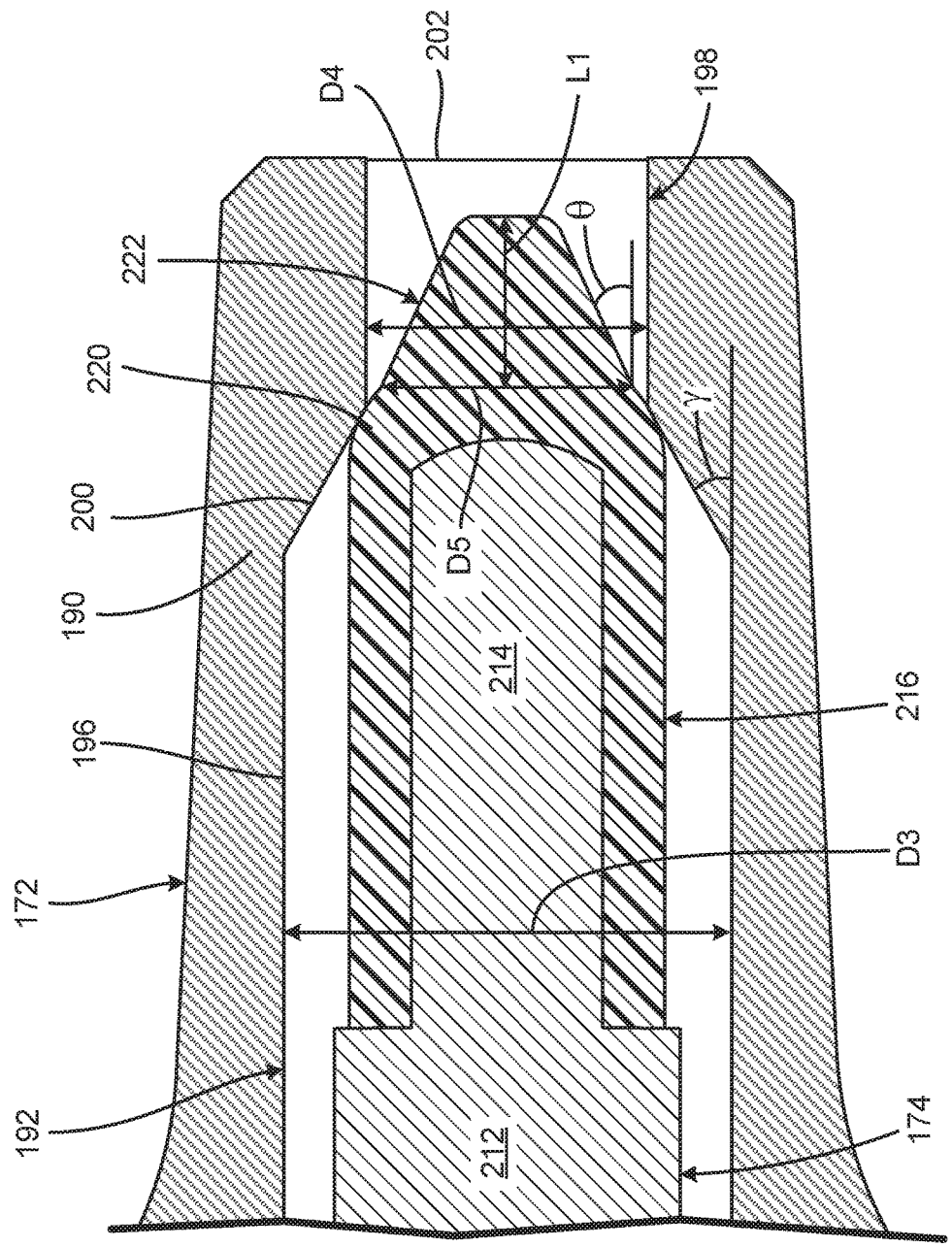
FIG. 7C is an enlarged cross-sectional view showing a nozzle in a closed position.

FIG. 7A is a cross-sectional view of nozzle 16 taken along line 7-7 in FIG. 1A showing nozzle 16 in an open position. FIG. 7B is an enlarged view of detail Z in FIG. 7A. FIG. 7C is an enlarged cross-sectional view showing nozzle 16 in a closed position. FIGS. 7A-7C will be discussed together. Nozzle 16 includes connector 170, nozzle body 172, nozzle stem 174, and nozzle spring 176. Connector 170 includes seating end 178 and connector bore 180. Seating end 178 includes shoulder 182, neck 184, and connector seal groove 186. Nozzle body 172 includes receiving end 188, dispensing end 190, nozzle bore 192, and vent hole 194. Dispensing end 190 includes upstream portion 196, downstream portion 198, and connecting portion 200. Upstream portion 196 includes upstream diameter D3. Downstream portion 198 includes downstream diameter D4 and nozzle outlet 202. Connecting portion 200 includes angle γ. Nozzle stem 174 includes inlet tube 204, stem flange 206, flow passages 208, and stem tip 210. Stem tip 210 includes main tip body 212, reduced diameter portion 214, and overmolded tip 216. Stem flange 206 includes flange seal groove 218. Overmolded tip 216 includes sealing portion 220 and tip cone 222. Tip cone 222 includes angle θ, base diameter D5, and length L1.

Connector 170, nozzle stem 174, and nozzle body 172 are disposed coaxially on nozzle axis A-A. Connector 170 is configured to attach to a handheld meter, such as handheld meter 10 (FIG. 1A). In some examples, connector 170 is attached to an extension, such as extension 14 (FIG. 1A). In other examples, connector 170 is attached to a swivel elbow of an oil bar, such as swivel elbow 258 (best seen in FIG. 8B). Seating end 178 of connector 170 extends into nozzle bore 192 and is connected to receiving end 188 of nozzle body 172. In some examples, seating end 178 includes external threads configured to mate with internal threads in receiving end 188. Neck 184 extends into nozzle bore 192 from seating end 178. Shoulder 182 extends radially from neck 184. Connector seal groove 186 extends into seating end 178, and connector seal 187 is disposed in connector seal groove 186.

Nozzle bore 192 extends through nozzle body 172 between receiving end 188 and dispensing end 190. Downstream portion 198 is a distal end of dispensing end 190. The metered fluid exits downstream portion 198 through nozzle outlet 202. Connecting portion 200 is a cone-shaped passage extending between and connecting upstream portion 196 and downstream portion 198. Connecting portion 200 provides a smooth transition between upstream diameter D3 of upstream portion 196 and downstream diameter D4 of downstream portion 198. Angle γ is an angle of connecting portion 200, and in some examples, angle γ is about 30-degrees. Vent hole 194 extends through nozzle body 172 into nozzle bore 192. Vent hole 194 is open to atmosphere to allow air to flow into and out of nozzle body 172 to prevent over pressurization in nozzle bore 192 as nozzle stem 174 transitions between the open position and the closed position.

Nozzle stem 174 is disposed within nozzle bore 192. Nozzle stem 174 is configured to shift between an open position, where sealing portion 220 is disengaged from connecting portion 200, and a closed position, where sealing portion 220 is engaged with connecting portion 200. Inlet tube 204 extends into connector bore 180 through seating end 178. Stem flange 206 extends radially from inlet tube 204. Stem flange 206 is configured to abut neck 184 to limit displacement of nozzle stem 174. Nozzle spring 176 extends between shoulder 182 and stem flange 206. Flange seal groove 218 extends into an outer edge of stem flange 206. Flange seal 207 is disposed in flange seal groove 218 between stem flange 206 and nozzle body 172. Flow passages 208 are disposed downstream of stem flange 206 and extend radially through nozzle stem 174 into inlet tube 204.

Stem tip 210 extends axially from inlet tube 204. Main tip body 212 extends from inlet tube 204, and reduced diameter portion 214 extends axially from main tip body 212. Overmolded tip 216 is disposed on reduced diameter portion 214. Overmolded tip 216 can be formed from an elastomer. In some examples, overmolded tip 216 is formed from nitrile rubber. It is understood, however, that overmolded tip 216 can be formed from any elastomer chemically-compatible with the metered fluid. Sealing portion 220 is configured to engage connecting portion 200 with nozzle stem 174 in the closed position. Tip cone 222 extends from sealing portion 220. Angle θ is the angle between tip cone 222 and downstream portion 198. In some examples, angle θ is between about 20-degrees and 30-degrees. In one example, angle θ is about 25-degrees.

Nozzle body 172 is movable relative to connector 170 to shift nozzle 16 between an activated state and a deactivated state. In the activated state, nozzle stem 174 is able to shift between the open and closed positions within nozzle body 172. In the deactivated state, stem flange 206 abuts neck 184 and sealing portion 220 abuts connecting portion 200 such that nozzle stem 174 is unable to shift within nozzle body 172. In the deactivated state nozzle stem 174 is locked in the closed position to prevent inadvertent fluid dispenses. To shift nozzle between the activated state and the deactivated state, the user screws nozzle body 172 further on to or off of connector 170, thereby changing the distance that nozzle stem 174 can move within nozzle body 172.

During operation, nozzle body 172 is placed in the activated position. With nozzle body 172 in the activated position the user initiates a flow of metered fluid to nozzle 16. The metered fluid flows through connector bore 180 and enters inlet tube 204. The metered fluid flows out of inlet tube 204 through flow passages 208, generating a fluid pressure within nozzle bore 192. The fluid pressure acts on stem flange 206 and overcomes the force of nozzle spring 176 to cause nozzle stem 174 to shift from the closed position to the open position. With nozzle stem 174 in the open position, sealing portion 220 is disengaged from connecting portion 200 and a flow path is opened through dispensing end 190. The meter fluid flows through upstream portion 196, between tip cone 222 and connecting portion 200, and exits nozzle body 172 through downstream portion 198.

Tip cone 222 facilitates a tight stream of metered fluid exiting dispensing end 190 through nozzle outlet 202. A ratio of base diameter D5 to length L1 is between about 10:7 and 3:2. In one example, the ratio of base diameter D5 to length L1 is about 11:8. Tip cone 222 prevents sputtering, fanning, and atomizing of the metered fluid exiting dispensing end 190. As the metered fluid enters connecting portion 200, the flow path created between connecting portion 200 and tip cone 222 orients the flow of the metered fluid along nozzle axis A-A. The meter fluid converges in downstream portion 198 and is dispensed out of nozzle outlet 202 in a tight stream. With nozzle stem 174 in the open position, tip cone 222 is offset from nozzle outlet 202 of downstream portion 198 by length L2. In some examples, length L2 is about 0.305-0.343 cm (about 0.120-0.135 in.). In one example, length L2 is about 0.320 cm (about 0.126 in.). A ratio of diameter D4 to length L2 is about 2:1. Length L2 and angle θ generate a laminar flow in downstream portion prior to the meter fluid exiting nozzle outlet 202. The laminar flow eliminates sputtering, fanning, and atomization of the metered fluid. In some examples, tip cone 222 facilitates a tight stream of meter fluid at flow rates up to about 10 gallons per minute.

After a dispense event is complete, the user releases the trigger and the flow of meter fluid to nozzle 16 is shut off. When the flow of meter fluid stops, valve spring 176 drives nozzle stem 174 to the closed position. With nozzle stem 174 in the closed position, sealing portion 220 engages connecting portion 200 and tip cone 222 extends into downstream portion 198. Connecting portion 200 aligns sealing portion 220 on nozzle axis A-A as nozzle stem 174 shifts to the closed position, facilitating alignment of nozzle stem 174 within dispensing end 190 and ensuring formation of a fluid-tight seal. As discussed above, overmolded tip 216 is formed from a compliant material, such as nitrile rubber, which facilitates formation of the fluid-tight seal even where contaminants are present in the meter fluid.

Tip cone 222 extends into downstream portion 198 with nozzle stem 174 in the closed position. In some examples, tip cone 222 occupies about 50% of the volume of downstream portion 198 when nozzle stem 174 is in the closed position. Tip cone 222 ensures that the mass of the metered fluid remaining in downstream portion 198 is sufficiently low such that the surface tension of the metered fluid prevents the metered fluid from dripping out of downstream portion 198. As such, tip cone 222 extending into and occupying at least 50% of the volume of downstream portion 198 prevents latent dripping of any metered fluid that is within downstream portion 198 when nozzle stem 174 shifts to the closed position.

Nozzle 16 provides significant advantages. Overmolded tip 216 facilitates sealing and alignment of nozzle stem 174. Overmolded tip 216 being compliant further facilitates sealing, particularly where contaminants are present in the metered fluid. Connecting portion 200 provides a smooth transition between upstream diameter D3 and downstream diameter D4, further ensuring alignment and sealing of nozzle stem 174. Tip cone 222 and length L2 generate laminar flow in downstream portion 198, which prevents sputtering, fanning, and/or atomization of the metered fluid. Tip cone 222 extends into and occupies downstream portion 198 with nozzle stem 174 in the closed position, thereby preventing latent dripping of the metered fluid out of nozzle outlet 202.

Figure 8A:
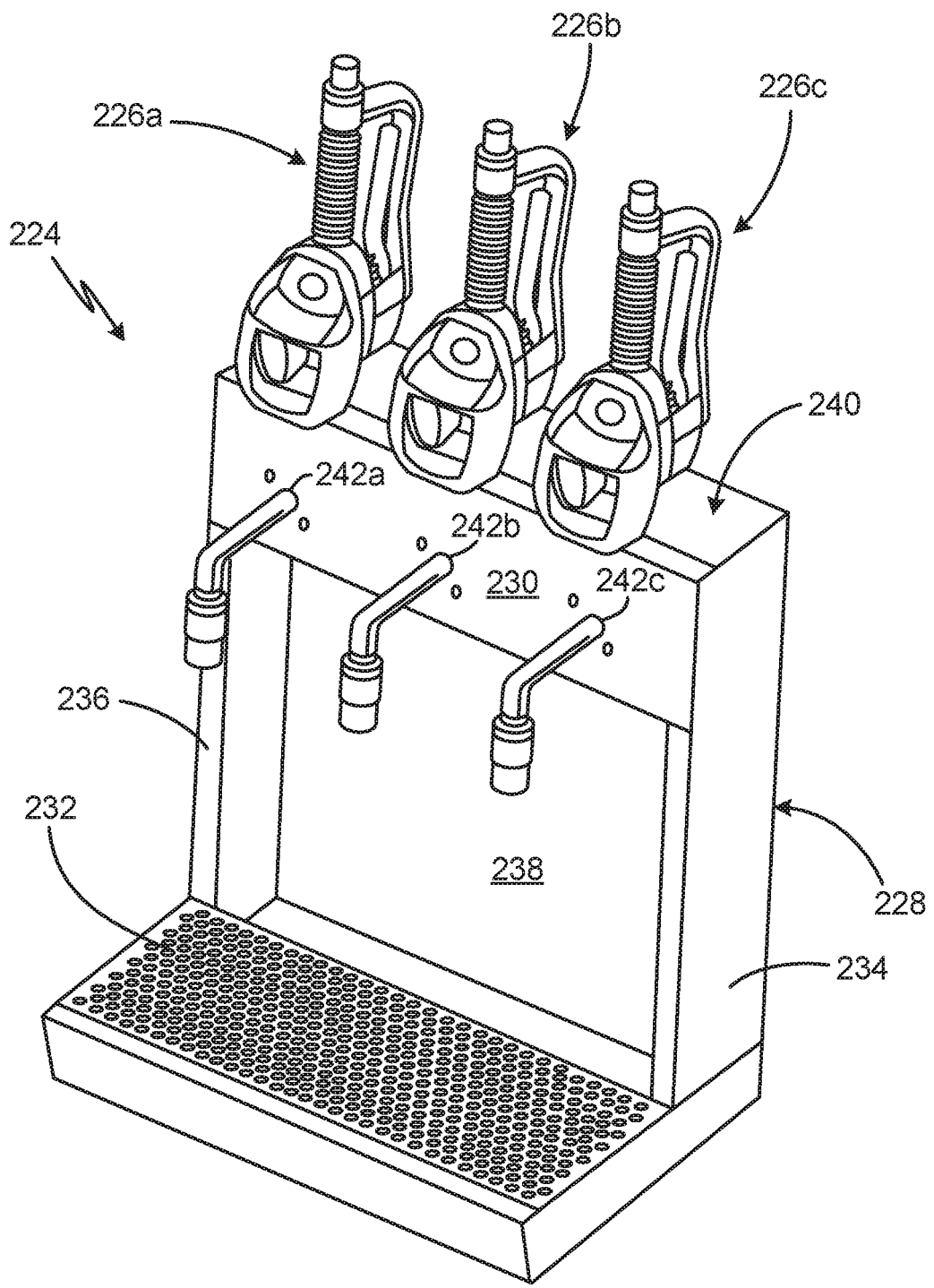
FIG. 8A is an isometric view of an oil bar.
Figure 8B:
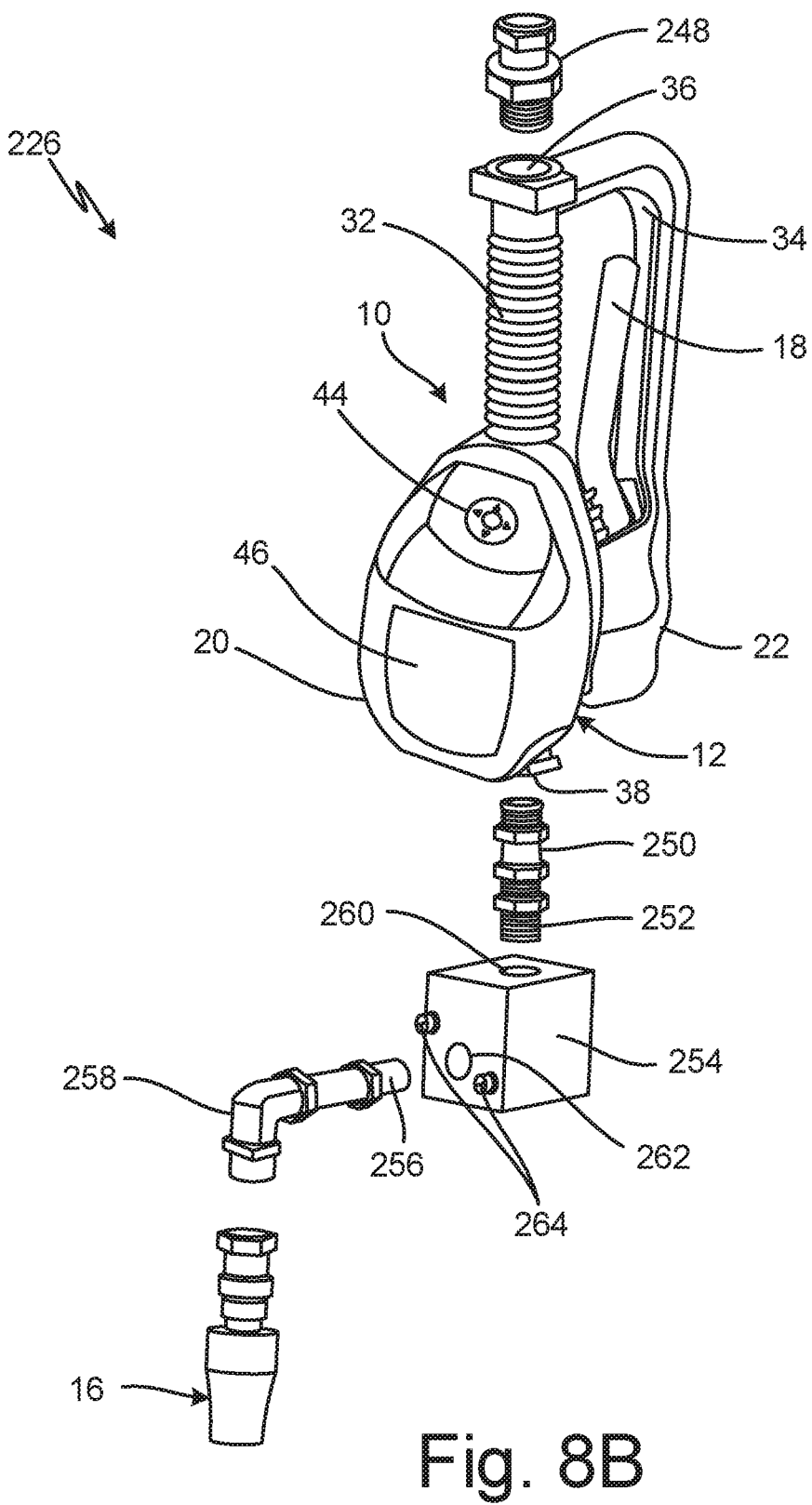
FIG. 8B is an exploded view of a dispense assembly for an oil bar.
Figure 8C:
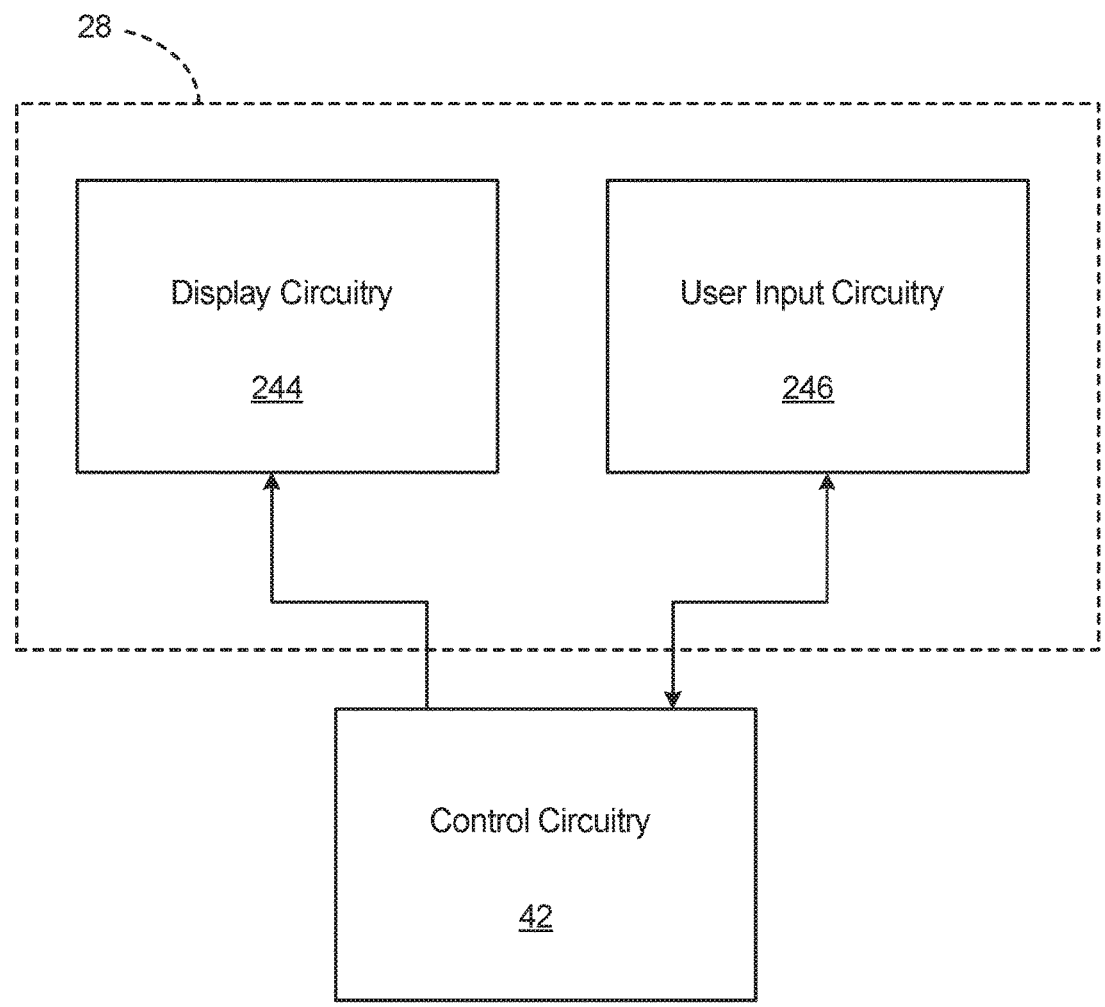
FIG. 8C is a simplified block diagram illustrating a meter controller.
Figure 8D:
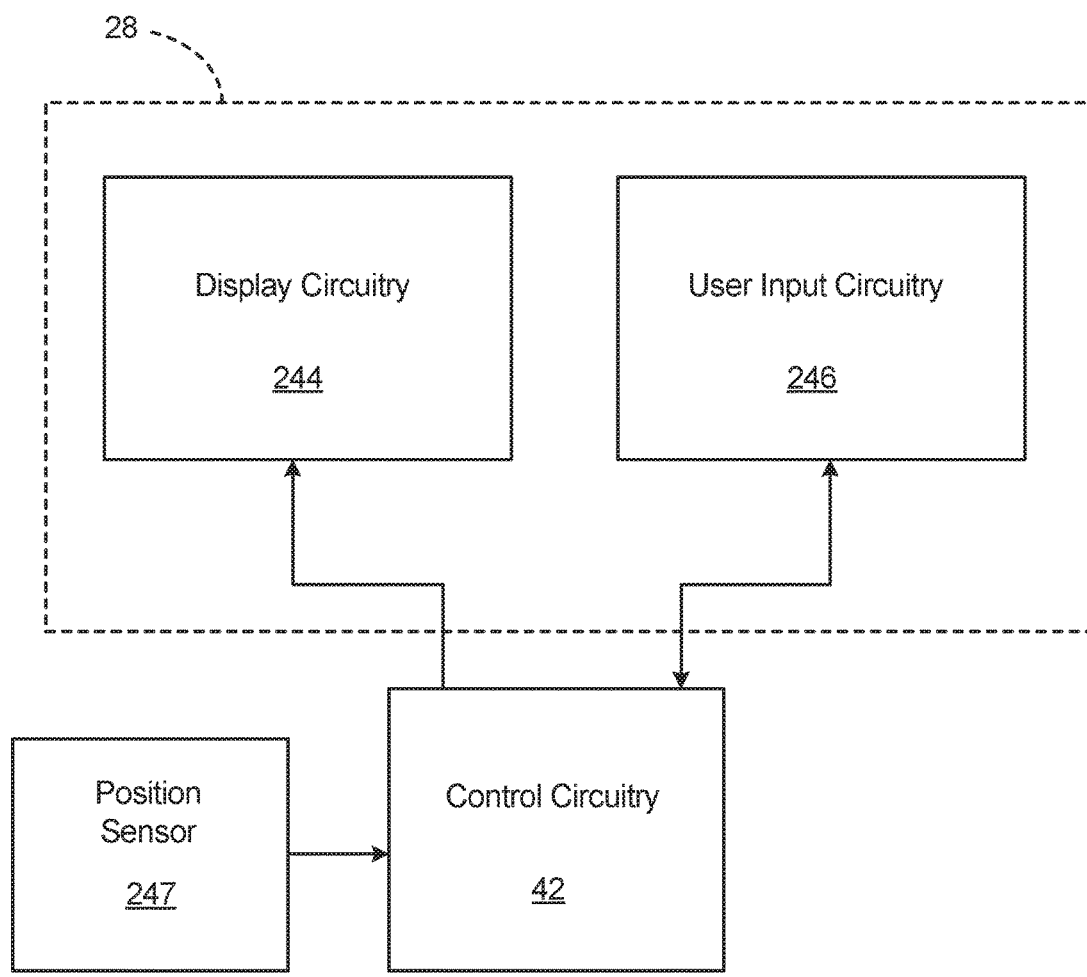
FIG. 8D is a simplified block diagram of another meter controller.

FIG. 8A is an isometric view of oil bar 224. FIG. 8B is an exploded view of dispense assembly 226. FIG. 8C is a block diagram illustrating an example of meter controller 24 and user interface 28. FIG. 8D is a block diagram illustrating another example of meter controller 24 and user interface 28. FIGS. 8A-8D will be discussed together. Oil bar 224 includes dispense assemblies 226a-226c (collectively herein "dispense assembly 226"), frame 228, front panel 230, and pan 232. Frame 228 includes first side panel 234, second side panel 236, back panel 238, and plenum 240. Front panel 230 includes dispenser openings 242a-242c (collectively herein "dispenser opening 242"). Control circuitry 42 of meter controller 24 is shown in FIGS. 8C-8D. Position sensor 247 is shown in FIG. 8D. Display circuitry 244 and user input circuitry 246 of user interface 28 are shown in FIGS. 8C-8D.

As shown in FIG. 8B, each dispense assembly 226 includes handheld meter 10, nozzle 16, inlet fitting 248, outlet fitting 250, manifold inlet adapter 252, manifold 254, manifold outlet adapter 256, and swivel elbow 258. Manifold 254 includes manifold inlet opening 260 and manifold outlet opening 262. Meter body 12, trigger 18, bezel housing 20, elastomeric trigger guard 22, and user interface 28 of handheld meter 10 are shown. Handle 32, integral trigger guard 34, fluid inlet 36, and fluid outlet 38 of meter body 12 are shown. User interface 28 includes input 44 and display 46.

Back panel 238 extends between and is connected to first side panel 234 and second side panel 236. In some examples, first side panel 234, second side panel 236, and back panel 238 are integrally formed as a single part. In other examples, first side panel 234 and second side panel are connected to back panel 238 by fasteners. Front panel 230 is mounted to a top of first side panel 234 and second side panel 236. Pan 232 is disposed at a bottom of frame 228. Plenum 240 is defined between front panel 230 and back panel 238. Dispense assemblies 226 are mounted on oil bar 224 and are configured to dispense fluid to containers. Handheld meter 10 is plumbed for incorporation on oil bar 224 to provide dispense authorization and fluid tracking. Manifold 254 is disposed in plenum 240 and is connected to front panel 230 by fasteners 264, which extend through front panel 230 and into manifold 254. Inlet fitting 248 extends into and is connected to fluid inlet 36. Inlet fitting 248 is configured to receive a supply hose extending from a bulk fluid storage tank. Outlet fitting 250 is connected to fluid outlet 38. Manifold inlet adapter 252 is connected to outlet fitting 250 and manifold inlet opening 260. Manifold outlet adapter 256 is connected to manifold outlet opening 262 and extends through dispenser opening 242 in front panel 230. Swivel elbow 258 is attached to an end of manifold outlet adapter 256 extending out of front panel 230. Nozzle 16 is connected to swivel elbow 258 and configured to dispense the metered fluid. Mounting multiple dispense assemblies 226 on oil bar 224 allows for various types of fluids to be connected to oil bar 224 for dispensing, such as where each dispense assembly 226 is connected to a different bulk storage tank containing different fluids.

User interface 28 includes display circuitry 244 and user input circuitry 246. User input circuitry 246 can be of any suitable configuration to enable actuation by the user. For example, input 44 can include a plurality of mechanical buttons that receive inputs from the user and provide the inputs to user input circuitry 246, with each button corresponding to a directional command for an indicator provided on display 46. Display circuitry 244 is of any suitable digital or analog display capable of producing a visual output viewable at display 46. Control circuitry 42 is electrically connected within handheld meter 10 and can be of any suitable configuration for controlling operation of handheld meter 10. Control circuitry 42 is configured to control the generation of displays on display circuitry 244 and to recognize and process operator commands provided through user input circuitry 246. While control circuitry 42 is described as configured to control operation of handheld meter 10, it is understood that control circuitry 42 can be separate from the control circuitry controlling operation of handheld fluid meter 10.

Handheld meter 10 is mounted in an inverted orientation on oil bar 224. Display 46 and input 44 are fixedly mounted on bezel housing 20. Meter controller 24 is configured to invert an orientation of a visual output provided by display 46 such that the visual output is readable by the user with handheld meter 10 mounted in the inverted orientation. The user prepares handheld meter 10 for use on oil bar 224 by inputting an oil bar command to handheld meter 10 via input 44. While the oil bar command is described as provided by the user, it is understood that the oil bar command can be automatically generated and provided to control circuitry 42.

As shown in FIG. 8D, handheld fluid meter 10 can include position sensor 247, which can be any suitable sensor for determining the relative position of handheld fluid meter 10, such as an accelerometer, for example. Position sensor 247 senses the relative position of handheld fluid meter 10 and is configured to determine when handheld fluid meter 10 is in the inverted position. Position sensor 247 provides the relative position information to control circuitry 42, and control circuitry 42 can automatically generate the oil bar command based on the relative position information indicating that handheld fluid meter 10 is in the inverted position. In another example, handheld fluid meter 10 can include a sensor, configured to generate the oil bar command based on handheld fluid meter 10 being in position on oil bar 224. For example, handheld fluid meter 10 can include a reed switch that is activated by a magnet installed on oil bar 224.

Control circuitry 42 receives the oil bar command from user input circuitry 246 and/or from position sensor 247 and provides orientation instructions to display circuitry 244. Based on the orientation instructions, the orientation of the visual output provided by display circuitry 244 is modified such that the visual output is readable by the user with handheld meter 10 mounted on oil bar 224. In one example, display circuitry 244 rotates the visual output 180-degrees.

In addition to rotating the visual orientation, control circuitry 42 can modify the functionality of the buttons of input 44 such that the orientation of the visual output is reflected in the functionality of the buttons. Control circuitry 42 modifies the functionality of the buttons of input 44 such that commands provided at each button are related to the desired relative direction on the visual output. For example, where input 44 is configured such that the button orientations are related to the standard, upright display orientation, control circuitry 42 is configured to invert the "up" and "down" buttons in addition to inverting the visual output provided by display 46. As such, the "up" button becomes the "down" button and the "down" button becomes the "up" button. As such, the commands input by the user are provided the desired directional control on visual output with handheld meter 10 mounted in the inverted position on oil bar 224. Control circuitry 42 can also invert the left and right buttons to correctly associate "left" and "right" with the inverted screen orientation. In other examples, input 44 is configured such that the button orientations are related to a relative direction on screen. In such an example, control circuitry 42 does not invert the commands from input 44, as the relative direction of the buttons to display 46 remains the same, even though the visual output is inverted. Control circuitry 42 thus inverts the visual output provided by display circuitry 244 and can modify the functionality of the buttons to ensure that the visual output is readable with handheld meter 10 in the inverted position, and to ensure that button commands are related to the desired relative direction on the visual output.

With the visual output of display screen 46 inverted, display screen 46 is readable by the user with handheld meter 10 mounted on oil bar 224. As discussed above, display 46 extends through bezel housing 20 and is oriented at angle α (shown in FIGS. 2B and 6A) relative to handle 32, such that display 46 is tilted towards handle 32. With display 46 at angle α, the visual orientation is angled upwards, towards the user and perpendicular to the user's line of sight. Angle α can be any desired angle for positioning display 46 in the user's line of sight while the user is dispensing with dispense assembly 226. As such, angle α can be between 90-degrees and 180-degrees. In some examples, angle α is between 150-degrees and 170-degrees. Display 46 is thus in an ergonomic viewing position for the user. In addition, trigger 18 is mounted above both display 46 and fluid outlet 38, which positions trigger 18 in an ergonomic position that allows the user to easily and simultaneously view display 46 and manipulate trigger 18.

Control circuitry 42 is described as inverting the visual output of display circuitry 244 and/or the functionality of the buttons of input 44 to prepare handheld fluid meter 10 for use on oil bar 224. It is understood, however, that the oil bar command is not limited to use of handheld fluid meter 10 on oil bar 224. For example, in automotive shops handheld fluid meters 10 can hang from a hose reel mounted on the ceiling. While hanging, the handheld fluid meter 10 is in the inverted position. Control circuitry 42 can modify the orientation of the visual output and the button functionality whenever handheld fluid meter 10 is in the inverted position, such as based on information received from position sensor 247. As such, the user is able to easily and quickly view the visual output whenever handheld fluid meter 10 is in the inverted position.

Dispense assembly 226 and meter controller 24 provide significant advantages. Mounting handheld meter 10 in the inverted position orients display 46 in an ergonomic position for the user. Mounting handheld meter 10 in the inverted position also reduces the number of parts and eliminates complicated plumbing previously required to make handheld meters suitable for use on oil bar 224. Dispense assembly 226 including handheld meter 10 reduces the required inventory in a shop as a special PN meter is not required for oil bar 224 applications. Control circuitry 42 modifies the orientation of visual output such that the visual output is easily readable with handheld meter 10 in the inverted position. Control circuitry 42 also modifies the functionality of the buttons of input 44 such that the button orientation is associated with the visual orientation, which allows the user to easily and intuitively control of handheld meter 10. Control circuitry 42 modifying the visual output based on information received from position sensor 247 ensures that the visual output is properly oriented whenever handheld fluid meter 10 is in an inverted position, without requiring user input.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A handheld fluid meter for use in an oil bar, the handheld meter comprising:
   a meter body comprising:
      a handle;
      a fluid inlet extending into the handle;
      a fluid outlet extending out of an end of the meter body opposite the handle;
   a trigger configured to be manually displaced to control a flow of fluid between the fluid inlet and the fluid outlet;
   a bezel housing mounted on the meter body, the bezel housing including a display opening;
   a display screen fixedly mounted within the display opening;
   a user input fixedly mounted on the bezel housing, the user input including a plurality of buttons;
   display circuitry configured to provide a visual output at the display screen in a plurality of orientations;
   user input circuitry configured to receive inputs from a user via the plurality of buttons to modify the visual output of the display screen; and
   control circuitry connected to communicate with the display circuitry and the user input circuitry, the control circuitry configured to receive an input regarding a desired orientation of the visual output from the user input circuitry and to provide instructions to the display circuitry to modify the orientation of the visual output.

2. The handheld fluid meter of claim 1, wherein the plurality of orientations include a standard orientation and an oil bar orientation.

3. The handheld fluid meter of claim 2, wherein the standard orientation is distinguished from the oil bar orientation by 180-degrees.

4. The handheld fluid meter of claim 2, wherein the visual output is oriented towards the handle in the standard orientation, and the visual output is oriented away from the handle in the oil bar orientation.

5. The handheld fluid meter of claim 1, wherein the plurality of buttons are mechanically-activated buttons.

6. The handheld fluid meter of claim 1, wherein the control circuitry is configured to modify the functionality of the plurality of buttons based on the orientation of the visual output.

7. The handheld fluid meter of claim 1, wherein the display screen is oriented at an angle between 90-degrees and 180-degrees relative to the handle.

8. The handheld fluid meter of claim 7, wherein the display screen is oriented at an angle between 160-degrees and 170-degrees relative to the handle.

9. A dispense assembly for use in an oil bar, the dispense assembly comprising:
a handheld fluid meter comprising:
a meter body comprising:
a handle;
a fluid inlet extending into the handle;
a fluid outlet extending out of an end of the meter body opposite the handle;
a trigger configured to be manually displaced to control a flow of fluid between the fluid inlet and the fluid outlet;
a bezel housing mounted on the meter body, the bezel housing including a display opening;
a display screen fixedly mounted within the display opening;
a user input fixedly mounted on the bezel housing, the user input including a plurality of buttons;
display circuitry configured to provide a visual output at the display screen in a plurality of orientations;
user input circuitry configured to receive inputs from a user via the plurality of buttons to modify the visual output of the display screen; and
control circuitry connected to communicate with the display circuitry and the user input circuitry, the control circuitry configured to receive an input regarding a desired orientation of the visual output from the user input circuitry and to provide instructions to the display circuitry to modify the orientation of the visual output;
a manifold configured to be mounted in an oil bar, the manifold including a manifold inlet opening and a manifold outlet opening;
wherein the handheld fluid meter is configured to be mounted on the manifold such that the handle extends vertically above the display.

10. The dispense assembly of claim 9, further comprising:
an inlet fitting configured to be received by the fluid inlet and to connect to a fluid supply hose;
an outlet fitting configured to be received by the fluid outlet;
a manifold inlet adapter configured to connect to the outlet fitting and the manifold inlet opening;
a manifold outlet adapter configured to connect to the manifold outlet opening;
a swivel elbow configured to connect to the manifold outlet adapter; and
a nozzle configured to connect to the swivel elbow.

11. The dispense assembly of claim 9, wherein the plurality of orientations include a standard orientation and an oil bar orientation.

12. The dispense assembly of claim 11, wherein the standard orientation is distinguished from the oil bar orientation by 180-degrees.

13. The dispense assembly of claim 11, wherein the visual output is oriented towards the handle in the standard orientation, and the visual output is oriented away from the handle in the oil bar orientation.

14. The dispense assembly of claim 9, wherein the control circuitry is configured to modify the functionality of the plurality of buttons based on the orientation of the visual output.

15. The dispense assembly of claim 9, wherein the display screen is oriented at an angle between 90-degrees and 180-degrees relative to the handle.

16. The dispense assembly of claim 15, wherein the display screen is oriented at an angle between 160-degrees and 170-degrees relative to the handle.

17. An oil bar assembly comprising:
a frame having a first side support member, a second side support member, and a back panel, the back panel extending between and connecting the first side support member and the second side support member;
a front panel extending between and attached to the first side support member and the second side support member, wherein the front panel and the back panel define a plenum, and wherein a dispenser opening extends through the front panel;
a dispense assembly mounted to the front panel, the dispense assembly comprising:
a handheld fluid meter comprising:
a meter body comprising:
a handle;
a fluid inlet extending into the handle;
a fluid outlet extending out of an end of the meter body opposite the handle;
a trigger configured to be manually displaced to control a fluid flow between the fluid inlet and the fluid outlet;
a bezel housing mounted on the meter body, the bezel housing including a display opening;
a display screen fixedly mounted within the display opening;
a user input fixedly mounted on the bezel housing, the user input including a plurality of buttons;
display circuitry configured to provide a visual output at the display screen in a plurality of orientations;
user input circuitry configured to receive inputs from a user via the plurality of buttons to modify the visual output of the display screen; and
control circuitry connected to communicate with the display circuitry and the user input circuitry, the control circuitry configured to receive an input regarding a desired orientation of the visual output from the user input circuitry and to provide instructions to the display circuitry to modify the orientation of the visual output;
a manifold disposed within the plenum and attached to the front panel, the manifold including a manifold inlet opening and a manifold outlet opening;
an outlet fitting extending into the fluid outlet;
a manifold inlet adapter extending between and connecting the outlet fitting and the manifold inlet opening;

a manifold outlet adapter extending through the dispenser opening and connected to the manifold outlet opening;

a swivel elbow connecting the manifold outlet adapter; and a nozzle connected to the swivel elbow.

18. The oil bar assembly of claim 17, wherein the plurality of orientations include a standard orientation and an oil bar orientation, and wherein the visual output is oriented towards the handle in the standard orientation, and the visual output is oriented away from the handle in the oil bar orientation.

19. The oil bar assembly of claim 17, wherein the display screen is oriented at an angle between 90-degrees and 180-degrees relative to the handle.

20. The oil bar assembly of claim 18, wherein the display screen is oriented at an angle between 160-degrees and 170-degrees relative to the handle.

* * * * *